US012748541B2

(12) United States Patent
Yang et al.

(10) Patent No.: US 12,748,541 B2
(45) Date of Patent: Sep. 29, 2026

(54) METHOD FOR MANAGING VIRTUAL ZONE

(71) Applicant: Samsung Electronics Co., Ltd., Suwon-si (KR)

(72) Inventors: Seungjun Yang, Suwon-si (KR); Nam Wook Kang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 96 days.

(21) Appl. No.: 18/475,866

(22) Filed: Sep. 27, 2023

(65) Prior Publication Data

US 2024/0220143 A1 Jul. 4, 2024

(30) Foreign Application Priority Data

Jan. 2, 2023 (KR) ........................ 10-2023-0000352

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ...... G06F 3/064; G06F 3/0604; G06F 3/0679; G06F 2212/7201; G06F 2212/7211; G06F 12/0246; G06F 3/0658; G06F 3/0659; G06N 20/00
See application file for complete search history.

(56) References Cited

U.S. PATENT DOCUMENTS

| | | | |
|---|---|---|---|
| 9,189,420 B2 | 11/2015 | Yu et al. | |
| 9,606,915 B2 | 3/2017 | Horspool et al. | |
| 10,467,195 B2 | 11/2019 | Yang et al. | |
| 10,902,929 B1 | 1/2021 | Pawlowski | |
| 11,100,005 B2 | 8/2021 | Sheridan | |
| 11,210,168 B1 | 12/2021 | Lam | |
| 11,340,810 B2 * | 5/2022 | Navon | G06F 3/064 |
| 2012/0215964 A1 | 8/2012 | Kaneko et al. | |
| 2015/0095546 A1 | 4/2015 | Bennett et al. | |
| 2019/0108889 A1 * | 4/2019 | Gholamipour | G06F 12/0623 |
| 2020/0050385 A1 | 2/2020 | Furey et al. | |

OTHER PUBLICATIONS

Extended European Search Report dated Feb. 2, 2024 issued in corresponding European Appln. No. 23190261.0.

* cited by examiner

*Primary Examiner* — Hosain T Alam
*Assistant Examiner* — Subir Kumar Chowdhury
(74) *Attorney, Agent, or Firm* — Harness, Dickey & Pierce, P.L.C.

(57) ABSTRACT

A storage device includes a non-volatile memory including a plurality of blocks, and a storage controller configured to divide the plurality of blocks into a plurality of zones, determine a first zone of the plurality of zones corresponding to a logical address received from a host, based on a value of the logical address, map the logical address to a physical address corresponding to a first block in the first zone, and replace at least one of the logical address or the first block with a logical address or a block of a second zone of the plurality of zones. The second zone is different from the first zone.

20 Claims, 20 Drawing Sheets

100

300

600

700

800

1000

1100

1200

METHOD FOR MANAGING VIRTUAL ZONE

CROSS-REFERENCE TO RELATED APPLICATION

This application claims priority to and the benefit of Korean Patent Application No. 10-2023-0000352 filed in the Korean Intellectual Property Office on Jan. 2, 2023, the entire contents of which are incorporated herein by reference.

FIELD

The inventive concepts relate to virtual zone management.

BACKGROUND

In a non-volatile memory (NVM) device, data recorded in a cell is maintained without being destroyed even when drive power is not supplied. Among non-volatile memories, flash memory is widely used in computers and memory cards because it has a function of electrically erasing cell data in batches.

In order to perform a request to access a flash memory-based data storage device from an operating system (OS) or a file system, a flash translation layer (FTL) is provided between the OS or file system and the flash memory. The FTL may include mapping information that defines a relationship between a logical address and a physical address of the flash memory. The FTL may convert a logical address into a physical address in flash memory using mapping information.

SUMMARY

Some example embodiments may provide a virtual zone management method that can efficiently store physical addresses.

Some example embodiments may provide a virtual zone management method that can evenly manage the lifetime of a block.

According to an aspect of the inventive concepts, a storage device includes a non-volatile memory including a plurality of blocks, and a storage controller configured to divide the plurality of blocks into a plurality of zones, determine a first zone of the plurality of zones corresponding to a logical address received from a host, based on a value of the logical address, map the logical address to a physical address corresponding to a first block in the first zone, and replace at least one of the logical address or the first block with a logical address or a block of a second zone of the plurality of zones, the second zone different from the first zone.

The storage controller may replace the first block with a second block having the lowest erase count value of the second zone.

The physical address of the first block and the physical address of the second block may be the same.

The storage controller may replace one of a super block, a plane, a bank, and a channel including the first block with corresponding to one among a super block, a plane, a bank, and a channel including a second block having the lowest erase count value of the second zone.

The storage controller may determine a first logical address corresponding to the first block, determine a second logical address corresponding to a second block having the lowest erase count value, and replace the first logical address with the second logical address.

The storage controller may determine a plurality of first logical address ranges corresponding to blocks having a relatively high erase count value in the first zone, determine a plurality of second logical address ranges corresponding to blocks having a relatively low erase count value in the second zone, and replace the plurality of first logical address ranges and the plurality of second logical address ranges with each other using a replacement table indicating whether each of the plurality of first logical address ranges is replaced.

The storage controller may map the logical address to a physical address of the address mapping table corresponding to the second zone such that erase count values of blocks included in the first zone and the second zone are uniform or substantially uniform.

The storage controller may determine the first zone based on an arbitrary bit value of the logical address.

The storage controller may perform a hash operation on the logical address and determine the first zone based on the hash value of the logical address.

The storage controller may determine the first zone by inputting the logical address to a trained machine learning model with a characteristic of a write request input from the host.

According to an aspect of the inventive concepts, an operation method of a storage device includes dividing a plurality of blocks included in a non-volatile memory into a plurality of zones, receiving a logical address from a host, determining a first zone of the plurality of zones corresponding to the logical address, based on the logical address, mapping the logical address to a physical address corresponding to a first block of the first zone, and replacing at least one of the logical address or the first block with a logical address or block of a second zone of the plurality of zones, based on an erase count value of the first block, the second zone different from the first zone.

The replacing may include replacing the first block with a second block having the lowest erase count value of the second zone.

A physical address of the first block and a physical address of the second block may be the same.

The replacing may include replacing one of a super block, a plane, a bank, and a channel including the first block with one of a super block, a plane, a bank, and a channel including a second block that has the lowest erase count value of the second zone.

The replacing may include determining a first logical address corresponding to the first block, determining a second logical address corresponding to a second block having the lowest erase count value, and replacing the first logical address with the second logical address.

The replacing may include determining a plurality of first logical address ranges corresponding to blocks having relatively high erase count values in the first zone, determining a plurality of second logical address ranges corresponding to blocks having relatively low erase count values in the second zone, and replacing the plurality of first logical address ranges and the plurality of second logical address ranges with each other using a replacement table indicating whether each of the plurality of first logical address ranges is replaced.

The replacing may include mapping the logical address to a physical address of the address mapping table corresponding to the second zone such that erase count values of blocks included in the first zone and the second zone are uniform or substantially uniform.

The determining a first zone of the plurality of zones corresponding to the logical address may include: determining the first zone based on a random bit value of the logical address; performing a hash operation on the logical address and determining the first zone based on the hash value of the logical address; and determining the first zone by inputting the logical address to a trained machine learning model with a characteristic of a write request input from the host.

According to an aspect of the inventive concepts, a flash translation layer structure includes a plurality of address mapping tables that correspond to a plurality of zones divided from a plurality of blocks of a non-volatile memory and store mapping information of a logical address and a physical address, a wear leveling manager configured to perform wear leveling by replacing a block having a highest erase count value in a first zone of the plurality of zones with a block having a lowest erase count value in a second zone of the plurality of zones, and a mapping manager configured to update a first address mapping table of the plurality of address mapping tables corresponding to the first zone, and a second address mapping table of the plurality of address mapping tables corresponding to the second zone, by reflecting a result of the wear leveling.

The flash translation layer structure may determine a zone corresponding to an input logical address among the plurality of zones based on a value of the logical address, and convert the input logical address to a physical address using an address mapping table that corresponds to the determined zone among the plurality of address mapping tables.

DETAILED DESCRIPTION

Figure 1:
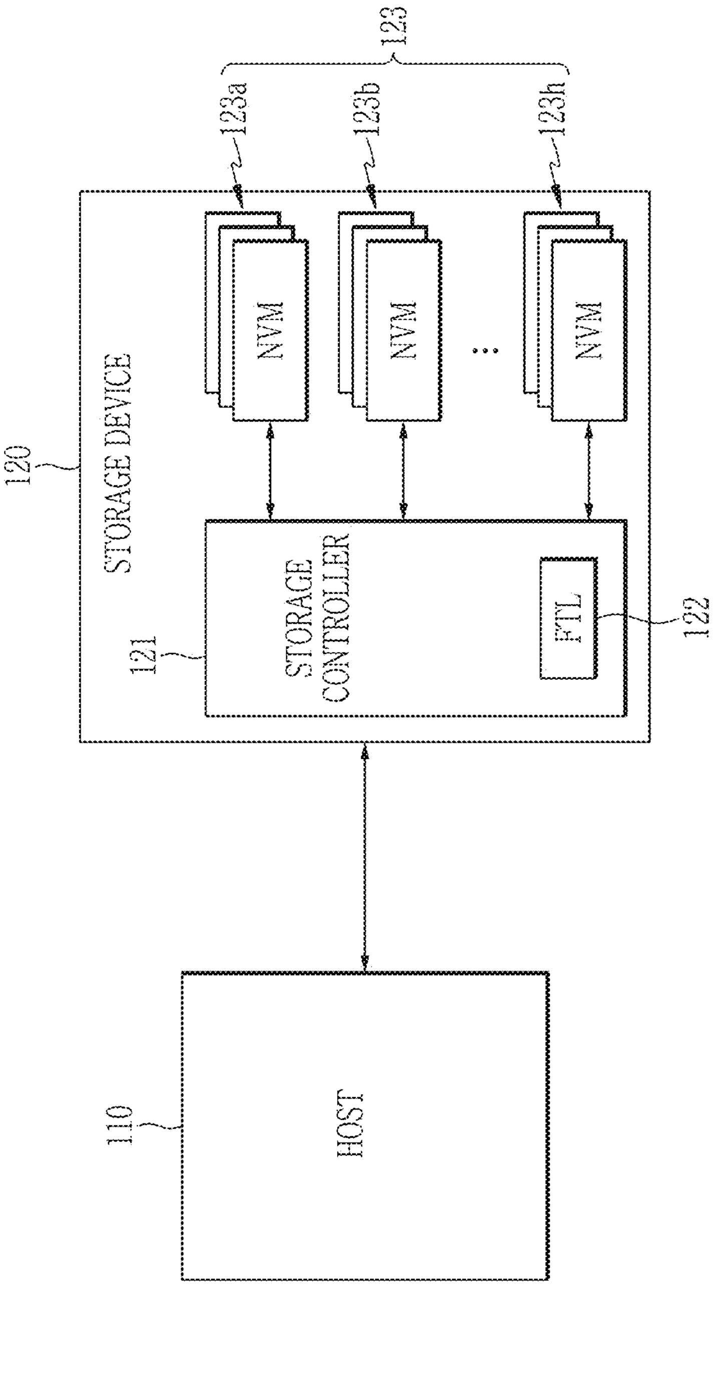
FIG. 1 is a block diagram of a storage system according to an example embodiment.

In the following detailed description, some example embodiments of the inventive concepts have been shown and described, simply by way of illustration. As those skilled in the art would realize, the described example embodiments may be modified in various different ways, all without departing from the scope of the inventive concepts.

Accordingly, the drawings and description are to be regarded as illustrative in nature and not restrictive. Like reference numerals designate like elements throughout the specification. In a flowchart described with reference to a drawing, the order of operations may be changed, several operations may be merged, a certain operation may be divided, and a specific operation may not be performed.

In addition, expressions written in the singular may be interpreted as singular or plural, unless explicit expressions such as “one” or “single” are used. Terms containing ordinal numbers, such as first and second, may be used to describe various configurations elements, but constituent elements are not limited by these terms. These terms may be used for the purpose of distinguishing one constituent element from another constituent element.

FIG. 1 is a block diagram of a storage system according to an example embodiment.

Referring to FIG. 1, a storage system 100 includes a host 110 and a storage device 120.

The host 110 controls the overall operation of the storage system 100. The host 110 may execute an operating system (OS). For example, an operating system executed by the host 110 may include a file system for file management and a device driver for controlling peripheral devices including the storage device 120 at the operating system level.

The host 110 may communicate with the storage device 120 through various interfaces. For example, the host 110 may communicate with the storage device 120 through various interfaces such as a universal serial bus (USB), a multimedia card (MMC), a PCI Express (PCI-E), an AT attachment (ATA), a serial AT attachment (SATA), a parallel AT attachment (PATA), a small computer system interface (SCSI), a serial attached SCSI (SAS), an enhanced small disk interface (ESDI), integrated drive electronics (IDE), a non-volatile memory express (NVMe), and the like. The host 110 may transmit a read request or write request to the storage device 120, and the storage device 120 may write data into the non-volatile memory 123 in response to the write request or read request, or may write data to the non-volatile memory 123 or read data from the non-volatile memory 123.

The host 110 may be implemented as an application processor (AP) or system-on-a-chip (SoC), but example embodiments are not limited thereto. In addition, for example, the host 110 may be implemented as an integrated circuit, a motherboard, or a database server, but example embodiments are not limited thereto.

The storage device 120 is accessed by the host 110. The storage device 120 may include a storage controller 121 and a plurality of non-volatile memories **123*a*, 123*b*, . . . , and 123*h*. The storage device 120 may store data or process data in response to an instruction from the host 110. For example, the storage device 120** may be a solid state drive (SSD), a smart SSD, an embedded multimedia card (eMMC), an embedded universal flash storage (UFS) memory device, a UFS memory card, a compact flash (CF), a secure digital (SD), a micro-SD, a mini-SD, extreme Digital (xD), or a memory stick, but example embodiments are not limited thereto.

The storage controller 121 may control the operation of the storage device 120. For example, the storage controller 121 may control the operation of a plurality of non-volatile memories 123*a*, 123*b*, . . . , and 123*h* based on a command, an address, and data received from the host 110.

The storage controller 121 may control the non-volatile memory 123 in response to a request received from the host 110. The requests may include commands, addresses, data, and the like. The storage controller 121 may write data into the non-volatile memory 123 or read data from the non-volatile memory 123 according to a command of the host 110.

The storage controller 121 may manage and/or control read and write operations of the non-volatile memory 123. In the non-volatile memory 123, a page is a unit of read and write operations, and a block is a unit of erase operations. Since the non-volatile memory 123 does not support overwrite operations, a process to copy all valid data in the block to which the page belongs to another empty block and erases the previous block is desired or required in order to modify data recorded in the page. Since this process involves a plurality of page copy (page read and write) and erase operation processes, overall performance of the non-volatile memory 123 may be reduced.

The storage controller 121 may include an FTL 122 that manages read and write operations of the non-volatile memory device 123. The FTL 122 may perform address mapping, garbage collection, wear leveling, and the like.

The FTL 122 may map logical addresses generated by a file system of the host 110 to physical addresses of the non-volatile memory device 123. The FTL 122 provides an interface between the file system of the host 110 and the non-volatile memory device 123 to hide the delete operation of the non-volatile memory device 123. For example, when the FTL 122 receives an overwrite request from the host 110, instead of overwriting the original page, the FTL 122 writes the corresponding data to an empty page, thereby reducing additional page copy and erase operations. The FTL 122 reduces unnecessary read, write, and erase operations due to overwriting, but may generate a large number of pages (e.g., invalid pages) that store data older than the latest data. In order to inhibit or prevent the storage space of the non-volatile memory device 123 from being wasted due to invalidated pages, the FTL 122 may perform garbage collection to periodically delete invalidated pages.

The FTL 122 may map logical addresses to physical addresses of the non-volatile memory 123 divided into a plurality of zones. The FTL 122 may determine one of the plurality of zones as a zone corresponding to a logical address, and map the logical address to a physical address within the determined zone.

In an example embodiment, the FTL 122 may determine any one of the plurality of zones as a zone corresponding to the logical address based on a value of the logical address. Specifically, the FTL 122 may determine one of the plurality of zones as a zone corresponding to a logical address based on a value of an arbitrary bit (e.g., MSB, LSB, etc.) of the logical address. For example, if the non-volatile memory 123 is divided into the first zone and the second zone, the first zone or the second zone may be determined as the zone corresponding to the logical address according to whether the MSB of the logical address is “1” or “0”.

In an example embodiment, the FTL 122 may perform a hash operation on the logical address and determine one of the plurality of zones as a zone corresponding to the logical address based on a hash value of the hash operation. In some example embodiments, the FTL 122 may perform a hash operation on some bits of the logical address, and determine one of the plurality of zones as a zone corresponding to the logical address based on the hash value. For example, when the non-volatile memory 123 is divided into four zones and a 2-bit hash value is calculated from the logical address, one of the four zones according to the 2-bit hash value may be determined as a zone corresponding to the logical address.

In an example embodiment, the FTL 122 may determine any one of the plurality of zones as a zone corresponding to a logical address based on a machine learning model. A machine learning model may perform machine learning on write requests. The machine learning model may be used to determine any one of the plurality of zones as a zone corresponding to a logical address included in a write request. Various characteristics of the write request may be provided as input values to the machine learning model. For example, the characteristic or attribute of a write request may include information such as logical address, request size, continuity of logical addresses of adjacent write requests (e.g., workload), overwrite ratio, and the like. The machine learning model may use a variety of machine learning algorithms. For example, the machine learning model may use a variety of machine learning algorithms such as a linear regression algorithm, a support vector machine algorithm, a deep neural network algorithm, a deep stream algorithm, a K-average algorithm, a clustering algorithm, an autoencoder algorithm, a convolutional neural network algorithm, a Siamese network algorithm, and the like.

The FTL 122 may change a method of determining one of the plurality of zones as a zone corresponding to a logical address during operation of the storage device 120. For example, while determining a zone corresponding to a logical address using a hash operation, the FTL 122 may determine a zone corresponding to a logical address based on a machine learning model.

The FTL 122 may perform wear leveling such that blocks are uniformly or substantially uniformly used in order to inhibit or prevent excessive degradation of specific blocks in the non-volatile memory 123. The FTL 122 may balance erase counts (EC) of blocks (physical blocks). For example, the FTL 122 may map the logical address mapped to the physical address of a block with a high erase count to the physical address of a block with a low EC, and the logical address mapped to a block with a low EC to a physical address of a block with a high EC. Accordingly, the EC between blocks, that is, the usage frequency of blocks, can be equalized.

In an example embodiment, the FTL 122 may perform wear leveling between different zones. The FTL 122 may map a logical address mapped to a physical address of a block with a highest EC value included in a first zone to a physical address of a block with a lowest EC value included in a second zone, and a logical address mapped to a physical address of a block with the lowest EC included in the second zone to a physical address of a block with the highest EC included in the first zone. In some example embodiments, the FTL 122 may perform wear leveling with a super block unit, a plane unit, a bank unit, or a channel unit formed of several consecutive blocks.

The FTL 122 may store and update mapping information for converting logical addresses into physical addresses in an address mapping table. The FTL 122 may be variously implemented as software, hardware, or a combination thereof that performs address conversion using the address mapping table in order to process read and write instructions transmitted from the host 110.

The FTL 122 may map logical addresses to address mapping tables corresponding to each zone. That is, bits representing physical address can be reduced in the address mapping table. For example, when the non-volatile memory 123 is not divided into a plurality of zones, one physical address corresponding to one logical address can be represented by 10 bits, but when the non-volatile memory 123 is divided into two zones, one physical address corresponding to one logical address can be represented by 9 bits. Therefore, according to an example embodiment, the address mapping table may be stored using a smaller size memory.

The plurality of non-volatile memories 123*a*, 123*b*, . . . , and 123*h* may store data. Each of the plurality of non-volatile memories 123*a*, 123*b*, . . . , and 123*h* may include a memory cell array including non-volatile memory cells that can maintain stored data even though the power of the storage system 100 is cut off, and the memory cell array may be divided into a plurality of memory blocks. The plurality of memory blocks may have a 2-dimensional horizontal structure in which memory cells are disposed on the same plane (or layer) two-dimensionally, or a 3-dimensional vertical structure in which non-volatile memory cells are disposed in three dimensions. The memory cell may be a single-level cell (SLC) that stores one bit of data or a multi-level cell (MLC) that stores two or more bits of data. However, example embodiments are not limited thereto, and each memory cell may be a triple level cell (TLC) storing 3-bit data or a quadruple-level cell storing 4-bit data.

Each of the plurality of non-volatile memories 123*a*, 123*b*, . . . , and 123*h* may include a plurality of dies or a plurality of chips each including a memory cell array. For example, the non-volatile memory 110 may include a plurality of chips, and each of the plurality of chips may include a plurality of dies. In an example embodiment, the plurality of non-volatile memories 123*a*, 123*b*, . . . , 123*h* may also include a plurality of channels each including a plurality of chips. The plurality of non-volatile memories 123*a*, 123*b*, . . . , and 123*h* may be connected to one channel, and the number of the plurality of non-volatile memories 123*a*, 123*b*, . . . , and 123*h* connected to one channel may be defined as a bank (way) or bank.

Each of the plurality of non-volatile memories 123*a*, 123*b*, . . . , and 123*h* may include a NAND flash memory. In another example embodiment, a plurality of non-volatile memories 123*a*, 123*b*, . . . , and 123*h* may include an electrically erasable programmable read-only memory (EEPROM), a phase change random access memory (PRAM), a resistive RAM (ReRAM), a resistance random access memory (RRAM), a nano-floating gate memory (NFGM), a polymer random access memory (PoRAM), a magnetic random access memory (MRAM), a ferroelectric random access memory (FRAM), or a similar memory. Hereinafter, the plurality of non-volatile memories 123*a*, 123*b*, . . . , and 123*h* will be described on the assumption that each is a NAND flash memory device.

In an example embodiment, each of the storage devices 120 may be a solid-state drive (SSD). In another example embodiment, each of the storage devices 120 may be a universal flash storage (UFS), a multi-media card (MMC), or an embedded MMC (eMMC). In another example embodiment, each of the storage devices 120 may be implemented in the form of a secure digital (SD) card, a micro SD card, a memory stick, a chip card, a universal serial bus (USB) card, a smart card, a compact flash (CF) card, or a similar card.

In an example embodiment, each of the storage device 120 may be connected with the host 110 through a block accessible interface including a serial advanced technology attachment (SATA) bus, a small computer small interface (SCSI) bus, a non-volatile memory express (NVMe) bus, a serial attached SCSI (SAS) bus, a UFS, eMMC, and the like, and may be accessed by the host 110 as a block unit through the block accessible interface.

In an example embodiment, the storage device 120 may be a random computing system such as a personal computer (PC), a server computer, a data center, a workstation, a digital television (digital TV), a set-top box, and the like. In another example embodiment, the storage device 120 may be a random mobile system such as a mobile phone, a smart phone, a tablet PC, a laptop computer, a personal digital assistant (PDA), a portable multimedia player (PMP), a digital camera, a camcorder, a portable game console, a music player, a video player, a navigation device, a wearable device, an Internet of Things (IoT) devices, an e-book, a virtual reality (VR) device, an augmented reality (AR) device, a drone, and the like.

Figure 2:
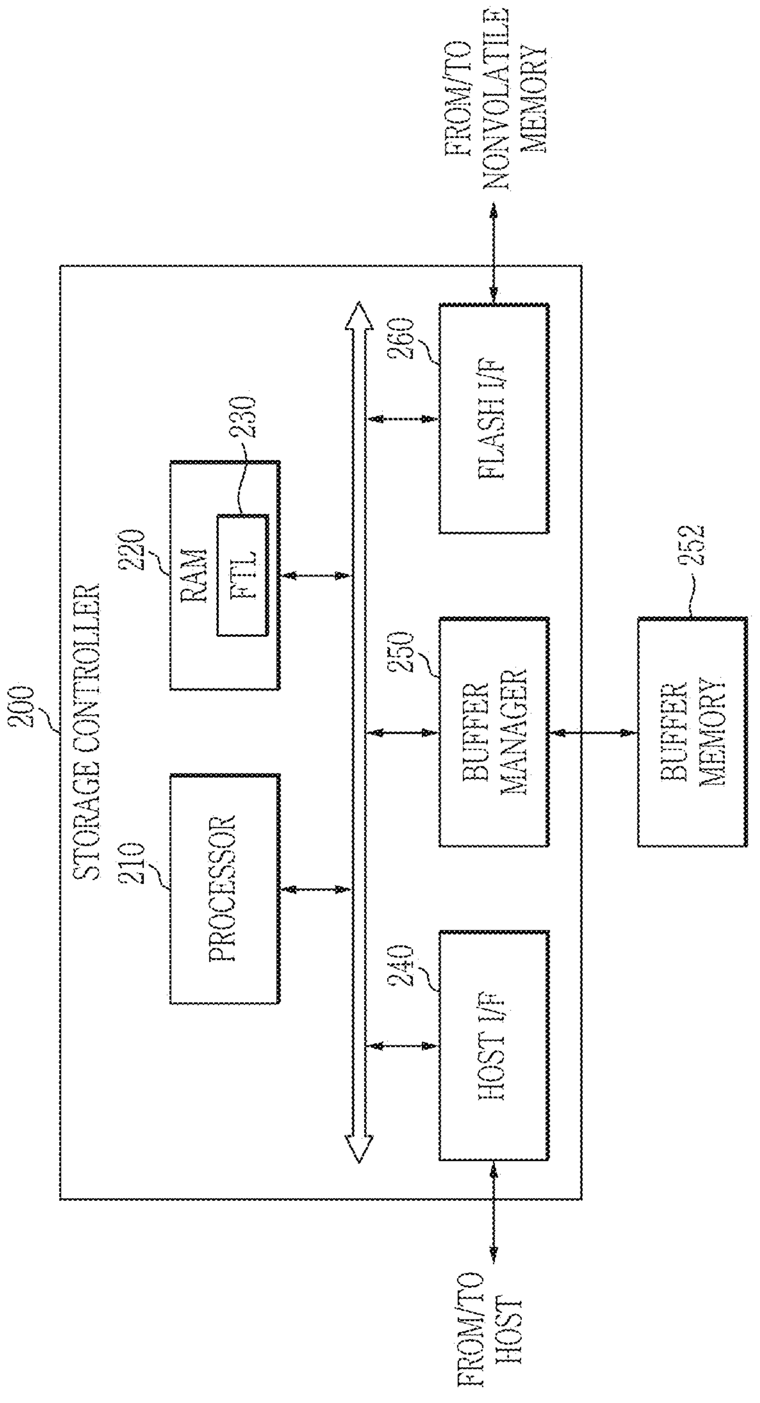
FIG. 2 is a block diagram of the storage controller according to an example embodiment.

FIG. 2 is a block diagram of the storage controller according to an example embodiment.

Referring to FIG. 2, the storage controller 121 may access the non-volatile memory 123 (e.g., referring to FIG. 1) and a buffer memory 252. The storage controller 121 may perform writing, reading, and erasing according to a request of the host (e.g., 110 of FIG. 1). The storage controller 121 may write write-requested data into the non-volatile memory 123, and output read-requested data from the non-volatile memory 123.

The storage controller 121 may manage the non-volatile memory 123 using the buffer memory 252. For example, the storage controller 121 may temporarily store data to be written in the non-volatile memory 123 or data read from the non-volatile memory 123 in the buffer memory 252.

The storage controller 121 may include a processor 210, a random access memory (hereinafter, RAM) 220, a host interface circuit 240, a buffer manager 250, and a flash interface circuit 260.

The processor 210 may control overall operations of the storage controller 121 and perform a logical operation. The processor 210 may communicate with the host 110 through the host interface circuit 240, communicate with the non-volatile memory 123 through the flash interface circuit 260, and communicate with the buffer memory 252 through the buffer manager 250. The processor 210 may control the non-volatile memory 123 by using the RAM 220 as an operation memory, a cache memory, or a buffer memory, but example embodiments are not limited thereto.

The RAM 220 may be used as an operating memory, a cache memory, or a buffer memory of the processor 210. The RAM 220 may store codes and instructions executed by the processor 210. The RAM 220 may store data processed by the processor 210. The RAM 220 may be implemented as a static RAM (SRAM). In particular, the RAM 220 may store the FTL 230. The FTL 230 performs address mapping, garbage collection, and wear leveling performed for interfacing between the non-volatile memory 123 and the host 110.

The host interface circuit 240 is configured to communicate with an external host under the control of the processor 210. The host interface circuit 240 may be formed to communicate using at least one of various communication methods such as USB (Universal Serial Bus), SATA (Serial AT Attachment), SAS (Serial Attached SCSI), HSIC (High Speed Interchip), SCSI (Small Computer System Interface), PCI (Peripheral Component Interconnection), PCIe (PCI express), NVMe (Non-Volatile Memory Express), UFS (Universal Flash Storage), SD (Secure Digital), MMC (MultiMedia Card), eMMC (embedded MMC), DIMM (Dual In-line Memory Module), RDIMM (Registered DIMM), LRDIMM (Load Reduced DIMM), and the like.

The buffer manager 250 may control the buffer memory 252 under the control of the processor 210. The buffer manager 250 may control the buffer memory 252 to temporarily store data exchanged between the non-volatile memory 123 and the host (e.g., 110 in FIG. 1). The buffer memory 252 may store instruction words and data executed and processed by the storage controller 121. The buffer memory 252 may temporarily store data stored or desired to be stored in the non-volatile memory 123.

The buffer memory 252 may be implemented with volatile memory such as a dynamic random access memory (DRAM) or a static RAM (SRAM). However, the buffer memory 252 is not limited thereto, and the buffer memory 252 may be implemented as various types of non-volatile memories such as a resistive non-volatile memory such as a magnetic RAM (MRAM), a phase change RAM (PRAM), or a resistive RAM (ReRAM), a flash memory, or a nano-floating gate memory (NFGM), a polymer random access memory (PoRAM), or a ferroelectric random access memory (FRAM). In some example embodiments embodiment, the buffer memory 252 is provided outside the storage controller 121, but example embodiments are not limited thereto, and the buffer memory 252 may be provided inside the storage controller 121.

The flash interface circuit 260 may communicate with the non-volatile memory 123 under the control of the processor 210. The flash interface circuit 260 may communicate with the non-volatile memory 123 through a plurality of channels. Specifically, the flash interface circuit 260 may transmit and receive commands, addresses, and data to and from the non-volatile memory 123 through a plurality of channels. The non-volatile memory 123 may perform a write operation, a read operation, and an erase operation under the control of the storage controller 121. The non-volatile memory 123 may receive a write command, an address, and data from the storage controller 121, and write data into a storage space identified by the address. The non-volatile memory 123 may receive a read command and an address from the storage controller 121, read data from the storage space identified by the address, and output the read data to the storage controller 121. The non-volatile memory 123 may receive an erase command and an address from the storage controller 121 and erase data in the storage space identified by the address.

Figure 3:
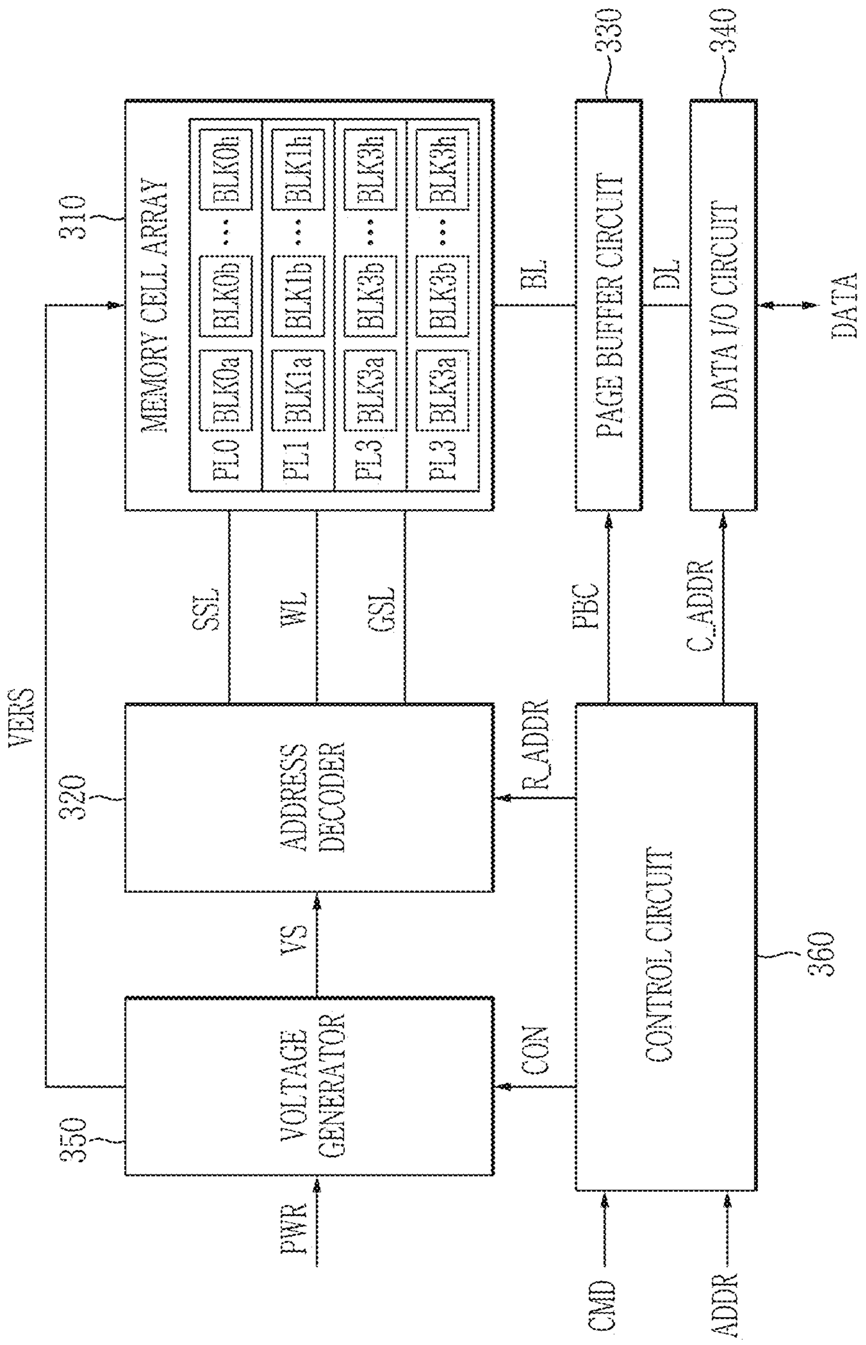
FIG. 3 is a block diagram of an example of a non-volatile memory included in a storage device according to an example embodiment.

FIG. 3 is a block diagram of an example of a non-volatile memory included in a storage device according to an example embodiment.

Referring to FIG. 3, a non-volatile memory 300 includes a memory cell array 310, an address decoder 320, a page buffer circuit 330, a data input and output circuit 340, a voltage generator 350, and a control circuit 360. For example, the non-volatile memory 300 may be one of the non-volatile memories 123*a*, 123*b*, . . . , and 123*h* of FIG. 1.

The memory cell array 310 is connected to the address decoder 320 through a plurality of string selection lines SSL, a plurality of word lines WL, and a plurality of ground selection lines GSL. In addition, the memory cell array 310 is connected to the page buffer circuit 330 through a plurality of bit lines BL. The memory cell array 310 may include a plurality of memory cells connected to the plurality of word lines WL and the plurality of bit lines BL. The memory cell array 310 may be divided into a plurality of planes PL0 to PL3 each including memory cells. Each of the plurality of planes PL0 to PL3 may include a plurality of memory blocks BLK0*a*, BLK0*b*, . . . , BLK0*h*, BLK1*a*, BLK1*b*, . . . , BLK1*h*, BLK2*a*, BLK2*b*, . . . , BLK2*h*, BLK3*a*, BLK3*b*, . . . , and BLK3*h*. In some example embodiments, a plurality of memory blocks (e.g., BLK0*a*, BLK0*b*, . . . , and BLK0*h*) included in the same plane (e.g., PL0) may share the same bit line. In addition, each of the plurality of memory blocks BLK0*a*, BLK0*b*, . . . , BLK0*h*, BLK1*a*, BLK1*b*, . . . , BLK1*h*, BLK2*a*, BLK2*b*, . . . , BLK2*h*, BLK3*a*, BLK3*b*, . . . , and BLK3*h*) is divided into a plurality of pages. In some example embodiments, the memory cell array 310 may be formed in a 2D array structure or a 3D vertical array structure.

The control circuit 360 receives a command CMD and an address ADDR from the outside (e.g., the host 110 and/or the storage controller 121 in FIG. 1), and controls the erase loop, program loop, and read operation of non-volatile memory 300 based on the command CMD and the address ADDR. Here, the program loop may include a program operation and a program verify operation, and the erase loop may include an erase operation and an erase verify operation. Here, the read operation may include a normal read operation and a data recovery read operation.

For example, the control circuit 360 may generate control signals CON for controlling the voltage generator 350 and control signals PBC for controlling the page buffer circuit 330 based on the command CMD, and generate a row address R-ADDR and a column address C-ADDR based on the address ADDR. The control circuit 360 may provide the row address R-ADDR to the address decoder 320 and the column address C-ADDR to the data input and output circuit 340.

The address decoder 320 is connected to the memory cell array 310 through a plurality of string selection lines SSL, a plurality of word lines WL, and a plurality of ground selection lines GSL.

For example, during an erase/program/read operation, the address decoder 320 determines at least one of the plurality of word lines WL as a selected word line in response to the row address R-ADDR, and other word lines except for the selected word line among the plurality of word lines WL may be determined as non-selected word lines.

In addition, during the erase/program/read operation, the address decoder 320 may determine at least one of the plurality of string selection lines SSL as a selection string selection line and the remaining string selection lines as non-selection string selection lines in response to the row address R-ADDR.

In addition, during the erase/program/read operation, the address decoder 320 may determine at least one of a plurality of ground selection lines GSL as the selected ground selection line and the remaining ground selection lines as non-selection ground selection lines in response to the row address R-ADDR.

The voltage generator 350 may generate voltages VS necessary for the operation of the non-volatile memory 300 based on a power supply voltage PWR and the control signals CON. The voltages VS may be applied to the plurality of string selection lines SSL, the plurality of word lines WL, and the plurality of ground selection lines GSL through the address decoder 320. In addition, the voltage generator 350 may generate an erase voltage desired or required for an erase operation based on the power supply voltage PWR and the control signals CON. The erase voltage may be directly applied to the memory cell array 310 or may be applied through a bit line BL.

For example, during the erase operation, the voltage generator 350 may apply an erase voltage to a common source line and/or bit line BL of one memory block, and may apply an erase allowable voltage (e.g., ground voltage) through the address decoder 320 to all word lines of one memory block or word lines corresponding to some sub-blocks. During the erase-verify operation, the voltage generator 350 may apply an erase-verify voltage to all word lines of one memory block or may apply the erase-verify voltage to word line units.

For example, during the program operation, the voltage generator 350 may apply a program voltage to the selected word line through the address decoder 320 and may apply a program prohibition voltage to the unselected word lines. During the program verification operation, the voltage generator 350 may apply a program verification voltage to the selected word line and may apply a verification pass voltage to the unselected word lines through the address decoder 320.

In addition, during a normal read operation, the voltage generator 350 may apply a read voltage to the selected word lines and may apply a read pass voltage to the unselected word lines through the address decoder 320. In addition, during a data recovery read operation, the voltage generator 350 may apply a read voltage to a word line adjacent to the selected word line through the address decoder 320 and may apply a recovery read voltage to the selected word line.

The page buffer circuit 330 may be connected to the memory cell array 310 through the plurality of bit lines BL. The page buffer circuit 330 may include a plurality of page buffers.

The page buffer circuit 330 may store write data to be programmed in the memory cell array 310 or store read data sensed from the memory cell array 310. That is, the page buffer circuit 330 may operate as a write driver or a sense amplifier according to an operation mode of the non-volatile memory 300.

The data input and output circuit 340 may be connected to the page buffer circuit 330 through data lines DL. The data input and output circuit 340 may provide write data DATA to the memory cell array 310 via the page buffer circuit 330 in response to the column address C-ADDR, or provide read data DATA output from the memory cell array 310 via the page buffer circuit 330 to the outside.

Figure 4:
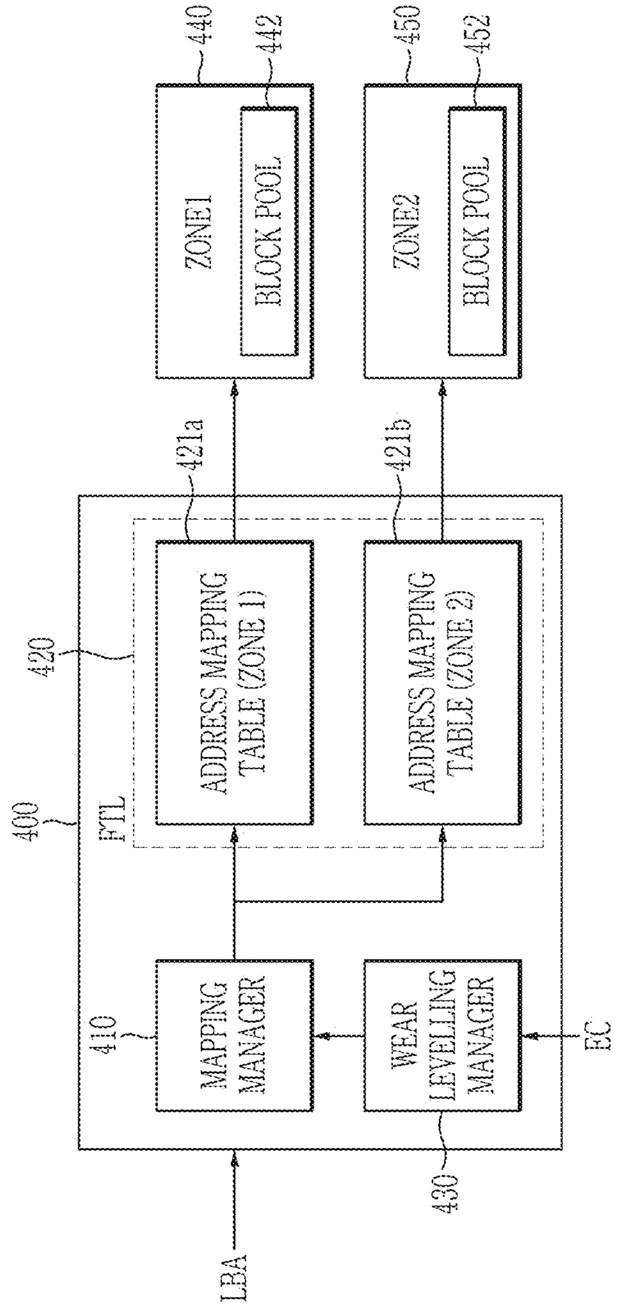
FIG. 4 is a block diagram of an FTL according to an example embodiment.

FIG. 4 is a block diagram of an FTL according to an example embodiment.

An FTL 400 may include a mapping manager 410, a mapping table 420, and a wear leveling manager 430.

The FTL 400 may use a mapping table 420 to convert logical addresses to physical addresses. The FTL 400 converts a logical block address LBA into a logical page number LPN. The address mapping table 420 may store mapping information between a logical page number LPN and a physical page number PPN. In an example embodiment, the FTL 400 may select one of the plurality of address mapping tables 421*a* and 421*b* corresponding to a plurality of zones based on input logical block addresses LBAs, and convert the logical block address LBA into a physical page number PPN corresponding to the logical block address LBA in the selected address mapping table 421*a* or 421*b*.

Each of the plurality of zones 440 and 450 may store block pools 442 and 452 including a list of blocks included in each of the plurality of zones 440 and 450. Information on blocks included in a first zone ZONE1 may be stored in the block pool 442, and information on blocks included in a second zone ZONE2 may be stored in the block pool 452.

The mapping manager 410 may update the address mapping table 420. In an example embodiment, the mapping manager 410 may change a physical address corresponding to a block by reflecting a result of wear leveling. The mapping manager 410 may replace blocks in different zones 440 and 450 with each other by reflecting the result of wear leveling. In some example embodiments, the mapping manager 410 may replace blocks in the first zone 440 with blocks in the second zone 450. The mapping manager 410 may replace one of a super block, a plane, a bank, and a channel including a block of the first zone 440 with a corresponding one of a super block, a plane, a bank, and a channel of the second zone 450. In some example embodiments, the mapping manager 410 may change physical page numbers between blocks replaced with each other between zones 440 and 450. The mapping manager 410 may update the block pools 442 and 452 included in each of the zones 440 and 450 by reflecting the result of the wear leveling operation.

In an example embodiment, the mapping manager 410 may change a physical address corresponding to a logical address by reflecting the result of the wear leveling operation. Specifically, the mapping manager 410 may change the physical address mapped to the logical address of the first zone 440 to the physical address mapped to the logical address of the second zone 450 by reflecting the result of the wear leveling operation.

In an example embodiment, the mapping manager 410 may change the zone corresponding to the logical address to another zone by reflecting the result of the wear leveling operation. The mapping manager 410 may change a physical address mapped to a logical address to a physical address of another zone by reflecting the result of the wear leveling operation. In some example embodiments, the mapping manager 410 may replace the logical address range of the first zone 440 with the logical address range of the second zone 450. The mapping manager 410 may change a plurality of logical address ranges by using a replacement table indicating whether a plurality of logical address ranges are replaced.

In addition, the mapping manager 410 may update the address mapping table 420 by reflecting a result of the garbage collection operation.

In an example embodiment, the mapping manager 410 may update the address mapping table 420 while data input and output operations with the host 110 are not performed. The mapping manager 410 may change a physical address corresponding to a block while data input and output operations with the host 110 are not performed. The mapping manager 410 may change a physical address corresponding to a logical address while data input and output operations with the host 110 are not performed. The mapping manager 410 may perform a physical address range replacement operation for at least one of a plurality of logical address ranges while data input and output operations with the host 110 are not performed. The mapping manager 410 may change a zone corresponding to a logical address to another zone while data input and output operations with the host 110 are not performed.

The wear leveling manager 430 may manage wear leveling information for blocks of a non-volatile memory. For example, when a wear leveling condition is satisfied, the wear leveling manager 430 may scan EC information of all blocks or some blocks sequentially or according to a prescribed method. When the scan result and the block where data is to be stored reach a large EC value, the physical address of the block may be changed such that data can be written to a block (e.g., free block) with a relatively small EC value (e.g., a low EC value below a specified threshold).

In an example embodiment, the wear leveling manager 430 may replace a physical address of a block having the highest EC value with a physical address of a block having the lowest EC value included in a zone different from the block having the highest EC value, based on EC information. The wear leveling manager 430 may replace a physical address of one of a super block, a plane, a bank, and a channel including the block with the largest EC value and a physical address of one of a super block, a plane, a bank, and a channel including the block with the lowest EC value.

In an example embodiment, the wear leveling manager 430 may determine a first logical address corresponding to a block having the highest EC value based on EC information. The wear leveling manager 430 may determine a second logical address corresponding to a block having the highest EC value and a block having the lowest EC value included in a zone different from the block having the highest EC value based on EC information. The wear leveling manager 430 may replace the first logical address and the second logical address with each other.

In an example embodiment, the wear leveling manager 430 may change a logical address corresponding to a block having the highest EC value to another zone based on EC information. The wear leveling manager 430 may include a logical address corresponding to a block having the highest EC value and a physical address mapped thereto in another zone.

The wear leveling manager 430 may provide information about the physical address to be changed to the mapping manager 410. The mapping manager 410 may update the address mapping table 420 according to information from the wear leveling manager 430.

Hereinafter, referring to FIG. 5 to FIG. 8, an operation for setting a plurality of zones will be described.

Figure 5:
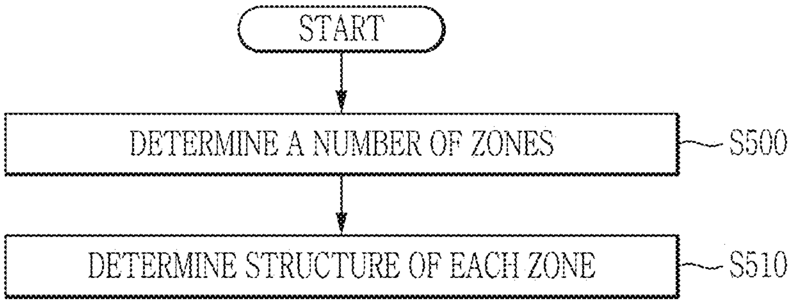
FIG. 5 is a flowchart of an operation of setting a zone of an operation method of the storage device according to an example embodiment.
Figure 6:
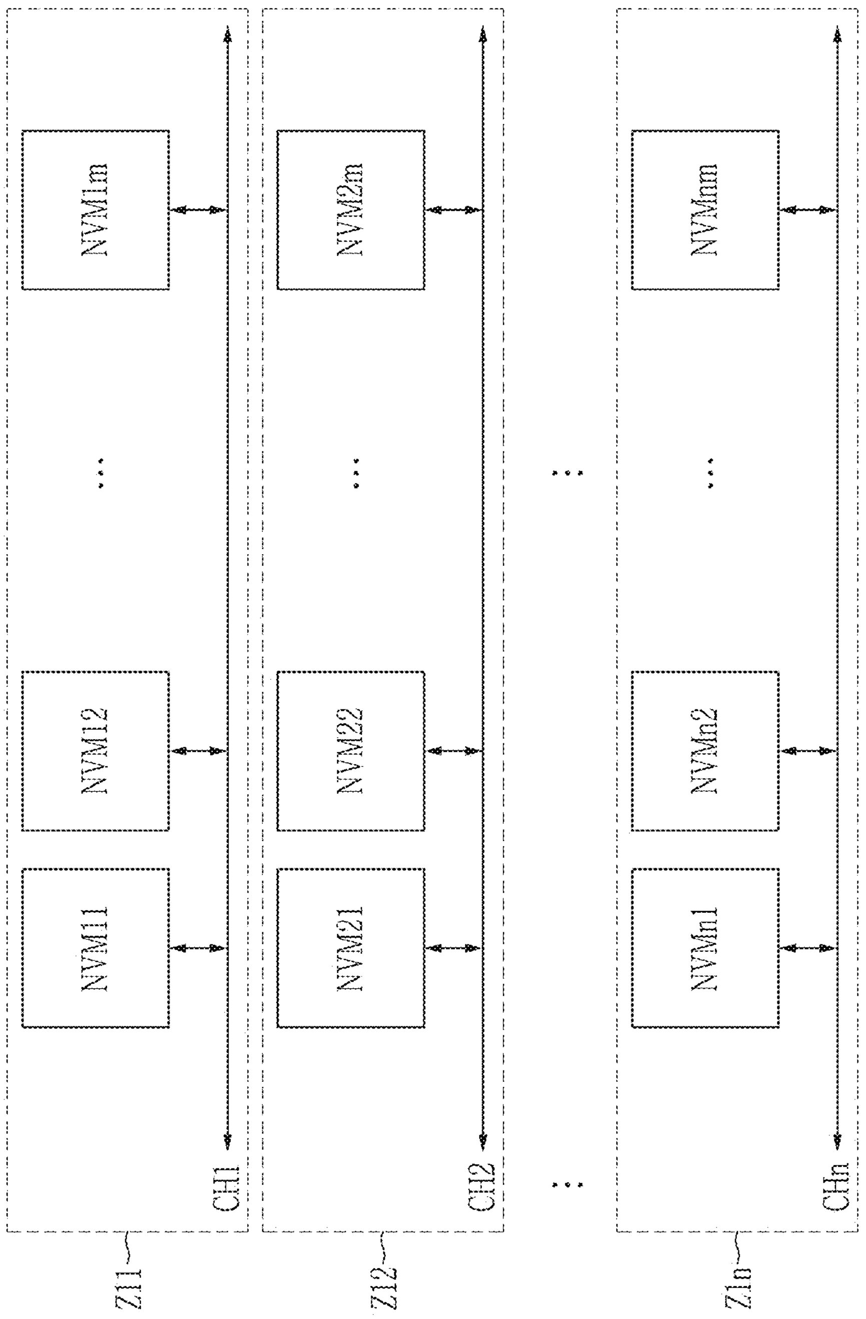
FIG. 6 to FIG. 8 are illustrate an operation of setting a zone in the storage device according to an example embodiment.
Figure 7:
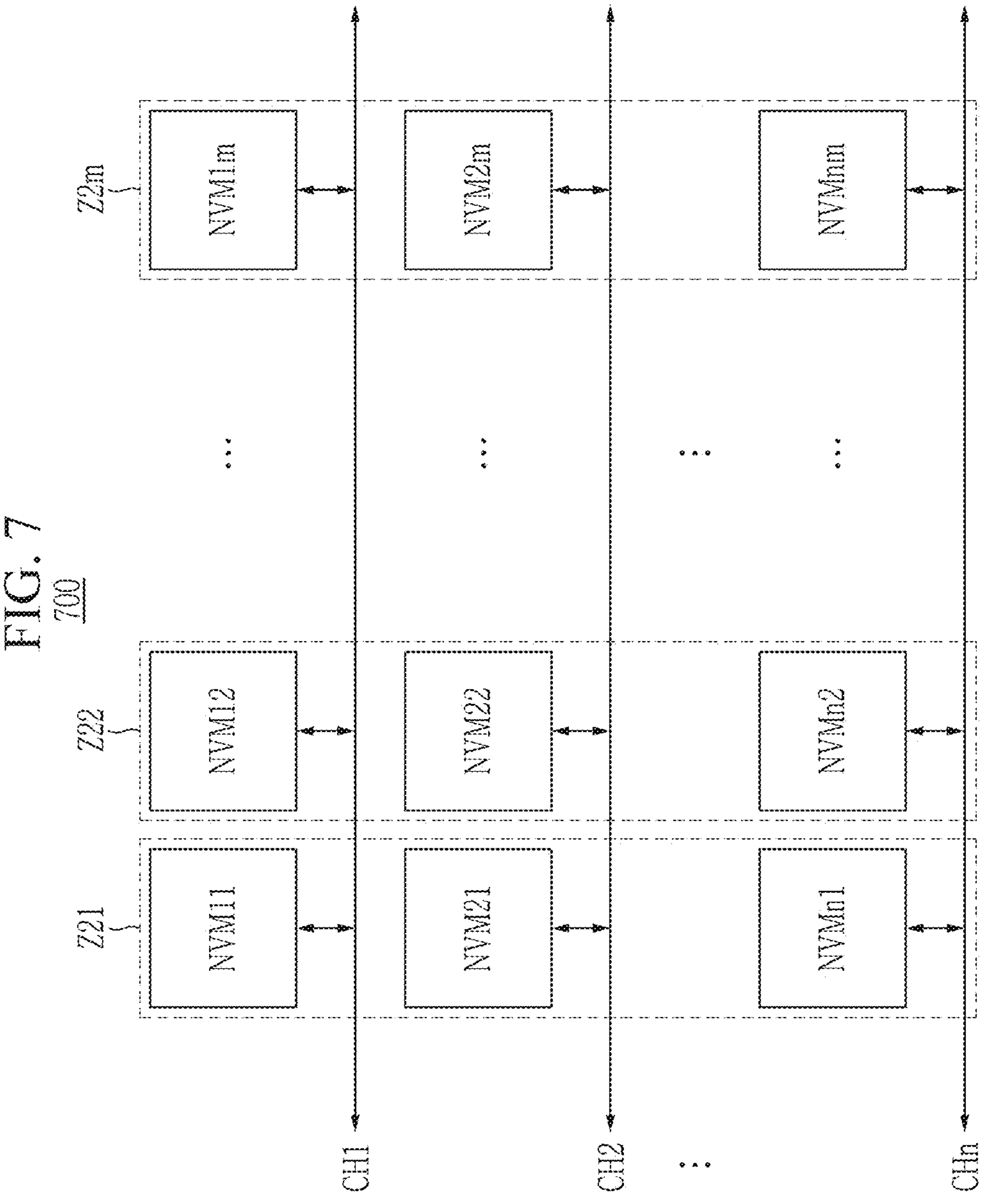
Figure 8:
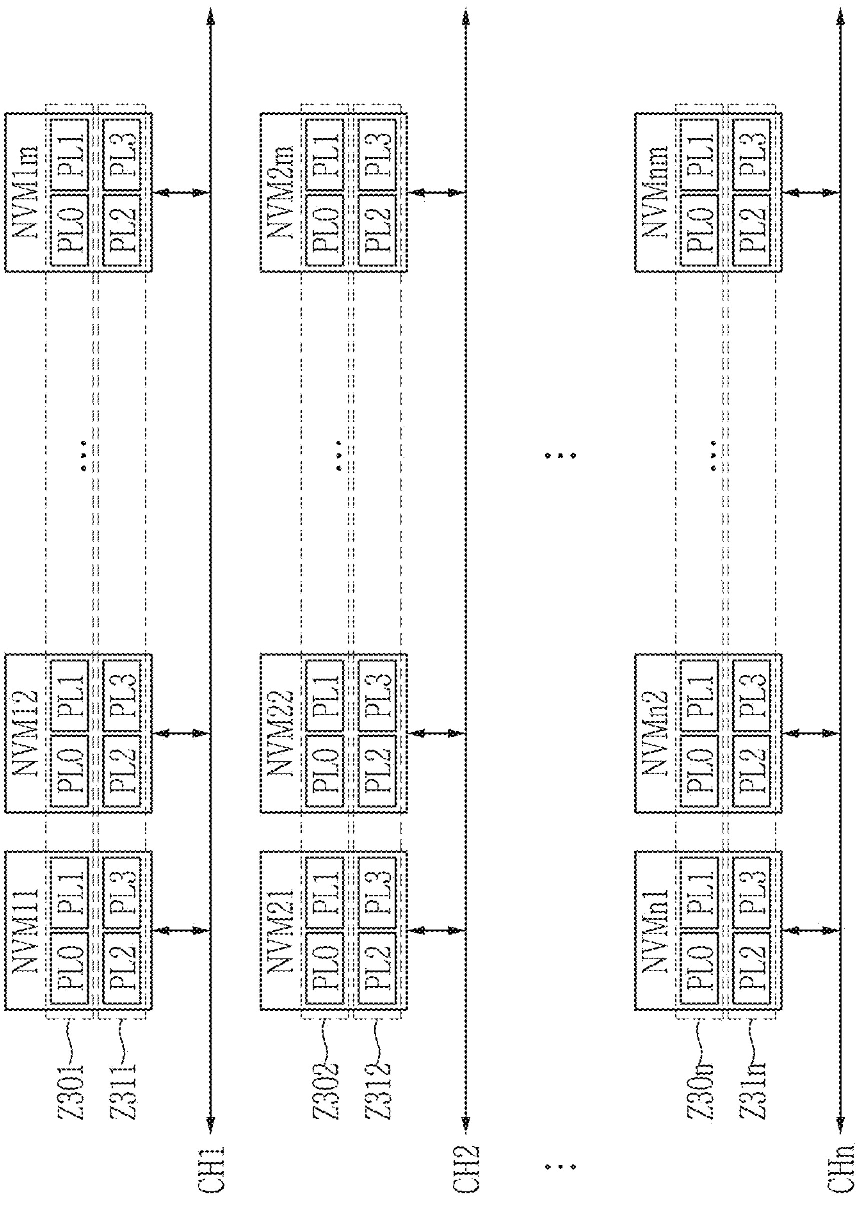

FIG. 5 is a flowchart of an operation of setting a zone of an operation method of the storage device according to an example embodiment, and FIG. 6 to FIG. 8 are provided for explaining an operation of setting a zone in the storage device according to an example embodiment.

Referring to FIG. 5, the storage controller 200 determines the number of zones in the non-volatile memory (S500). The storage controller 200 may determine the number of zones from the target capacity ratio of the RAM 220 to be reduced and the number of bits of the number of physical pages to represent the maximum number of physical pages included in the non-volatile memory. Equation 1 below shows an example method for calculating the number of bits in the number of physical pages.

$$PPN_{max} = \log\frac{SSD_{size}}{\text{Page}_{size}} \quad \text{(Equation 1)}$$

In Equation 1, $PPN_{max}$ may be the number of bits of the number of physical pages to express a maximum number of physical pages included in the non-volatile memory, $SSD_{size}$ may be capacity of the storage controller, and $\text{Page}_{size}$ may be a size of the physical pages. For example, when $SSD_{size}$ is 4 TB and $\text{Page}_{size}$ is 4 KB, $PPN_{max}$ may be calculated as $\log(2^{30})$, that is, 30. When the maximum number of physical pages is determined, the storage controller 200 may determine the number of zones based on Equation 2 below according to a target capacity ratio of the RAM 220 to be reduced.

$$N_{VMD} = 2^{\lceil PPN_{max}\times R\rceil} \quad \text{(Equation 2)}$$

For example, since $PPN_{max}$ is 30 and the target capacity ratio to be reduced is 5%, that is, 0.05, the value of $2^{\lceil 30\times 0.05\rfloor}$ is 4, $N_{VMD}$, which is the lowest value equal to or larger than this, is 4. This means that when the number of zones is four or more, the capacity of the RAM 220 can be reduced by a target amount. Accordingly, the storage controller 200 may determine the number of zones that are easy to manage while satisfying Equation 2 above.

The storage controller 200 determines the structure of each zone based on the determined number of zones (S510).

When the number of zones is less than or equal to the number of channels, the storage controller 200 may group at least one channel in one zone. Referring to FIG. 6, the non-volatile memory 600 may include a plurality of memories NVM11 to NVMnm connected to a plurality of channels CH1, CH2, . . . , and CHn (where m>n, and m and n are positive integers). A plurality of memories NVM11, NVM12, . . . , and NVM1*m* may be connected to a channel CH1, a plurality of memories NVM21, NVM22, . . . , and NVM2*m* may be connected to a channel CH2, and a plurality of memories NVMn1, NVMn2, . . . , and NVMnm may be connected to a channel CHn. When the number of zones is less than or equal to the number of channels, the storage controller 200 may determine one zone by grouping the channels. For example, when the number of channels is 16 and the number of zones is 16 or less, the storage controller 200 may determine the structure of zones in channel units. Zone Z11 may include a plurality of memories NVM11, NVM12, . . . , and NVM1*m* connected to channel CH1, and zone Z12 may include a plurality of memories NVM21, NVM22, . . . , and NVM2*m* connected to channel CH2, and the zone Zin may include a plurality of memories NVMn1, NVMn2, . . . , and NVMnm connected to the channel CHn.

When the number of zones is greater than the number of channels and less than the number of banks, the storage controller 200 may group at least one bank in one zone. Referring to FIG. 7, a non-volatile memory 700 may include a plurality of memories NVM11 to NVMnm connected to a plurality of channels CH1, CH2, . . . , and CHn. A plurality of memories NVM11, NVM21, . . . , and NVMn1 may form one bank, a plurality of memories NVM12, NVM22, . . . , and NVMn2 may form one bank, and a plurality of memories NVM1*m*, NVM2*m*, . . . , and NVMnm may form one bank. When the number of zones is greater than the number of channels and less than or equal to the number of banks, the storage controller 200 may group the banks to determine one zone. For example, when the number of channels is 16, the number of banks is 32, and the number of zones is greater than or equal to 17 and less than or equal to 32, the storage controller 200 may determine a zone structure in terms of bank units. Zone Z21 may include a plurality of memories NVM11 to NVMn1 forming one way, and zone Z22 may include a plurality of memories NVM12, NVM22, . . . , and NVMn2 forming one way, and zone Z2*m* may include a plurality of memories NVM1*m*, NVM2*m*, . . . , and NVMnm forming one way.

In addition, the storage controller 200 may organize each zone into a plane, a super block, or a block unit according to the number of zones. When divided into many zones, the storage controller 200 may organize each zone into smaller units. Referring to FIG. 8, a non-volatile memory 800 may include a plurality of memories NVM11 to NVMnm connected to a plurality of channels CH1, CH2, . . . , and CHn. Each of the plurality of memories NVM11 to NVMnm may include a plurality of planes PL0, PL1, PL2, and PL3. The storage controller 200 may determine one zone by grouping some planes in a memory connected to the same channel. For example, zone Z301 may include planes PL0 and PL1 of a plurality of memories NVM11, NVM12, . . . , and NVM1*m* connected to channel CH1, and zone Z311 may include planes PL2 and PL3 of a plurality of memories NVM11, NVM12, . . . , and NVM1*m* connected to channel CH1. Similarly, the zones Z302, Z312, . . . , Z30*n*, and Z31*n* may also include planes PL0, PL1, PL2, and PL3 of a plurality of memories NVM21, . . . , NVM2*m*, NVMn1, . . . , NVMnm connected to each of the channels CH2 and CHn.

Next, referring to FIG. 9 to FIG. 12, an operation of determining a zone of a logical address in a storage device according to an example embodiment will be described.

Figure 9:
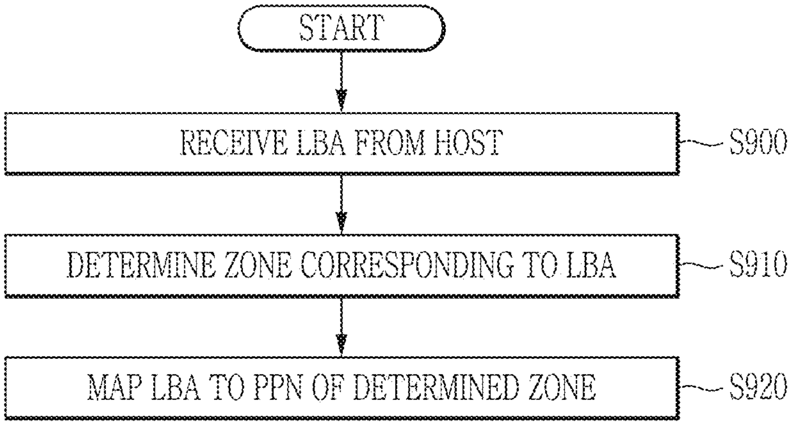
FIG. 9 is a flowchart of an operation of mapping a logical address of an operation method of a storage device to a physical address according to an example embodiment.
Figure 10:
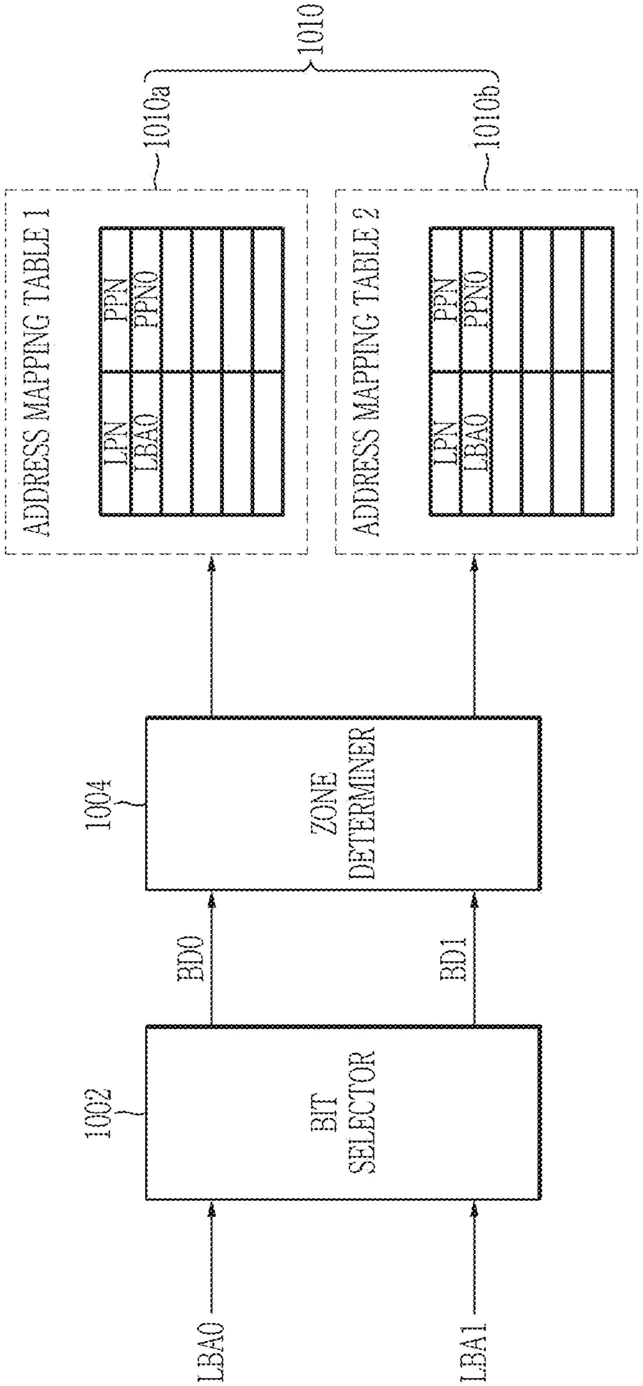
FIG. 10 to FIG. 12 illustrate an operation of mapping a logical address to a physical address in a storage device according to an example embodiment.
Figure 11:
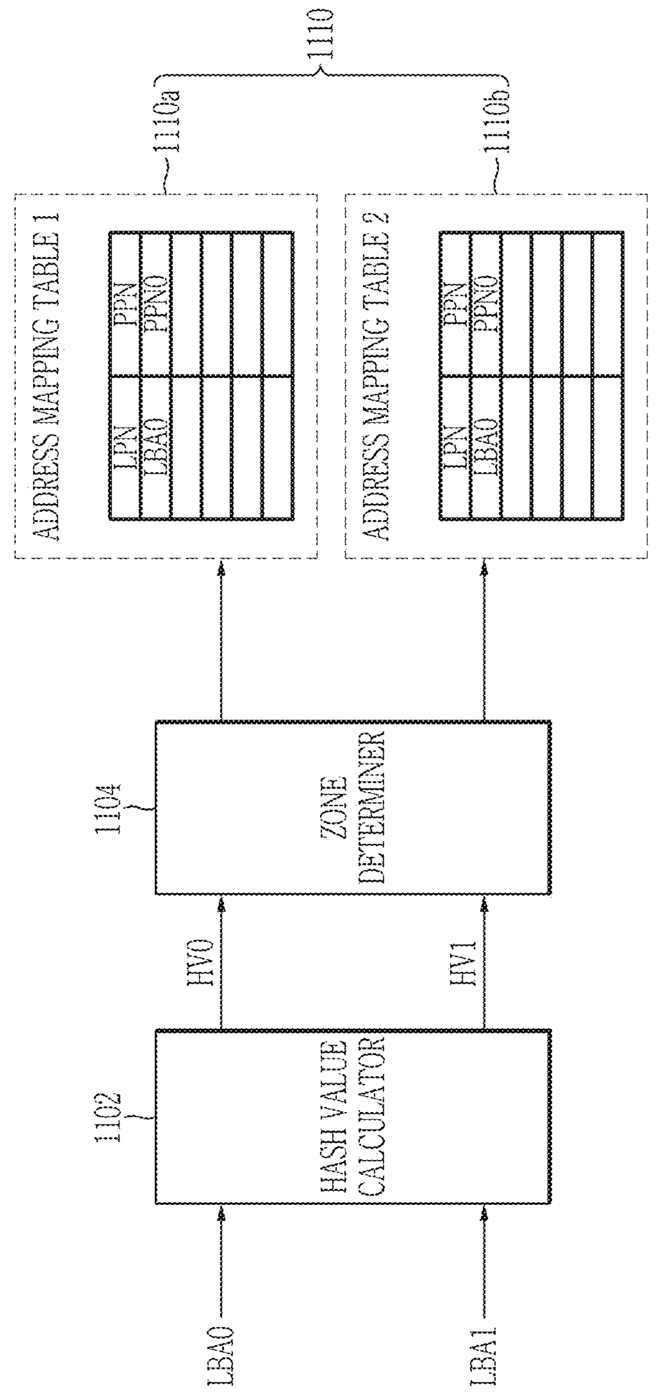
Figure 12:
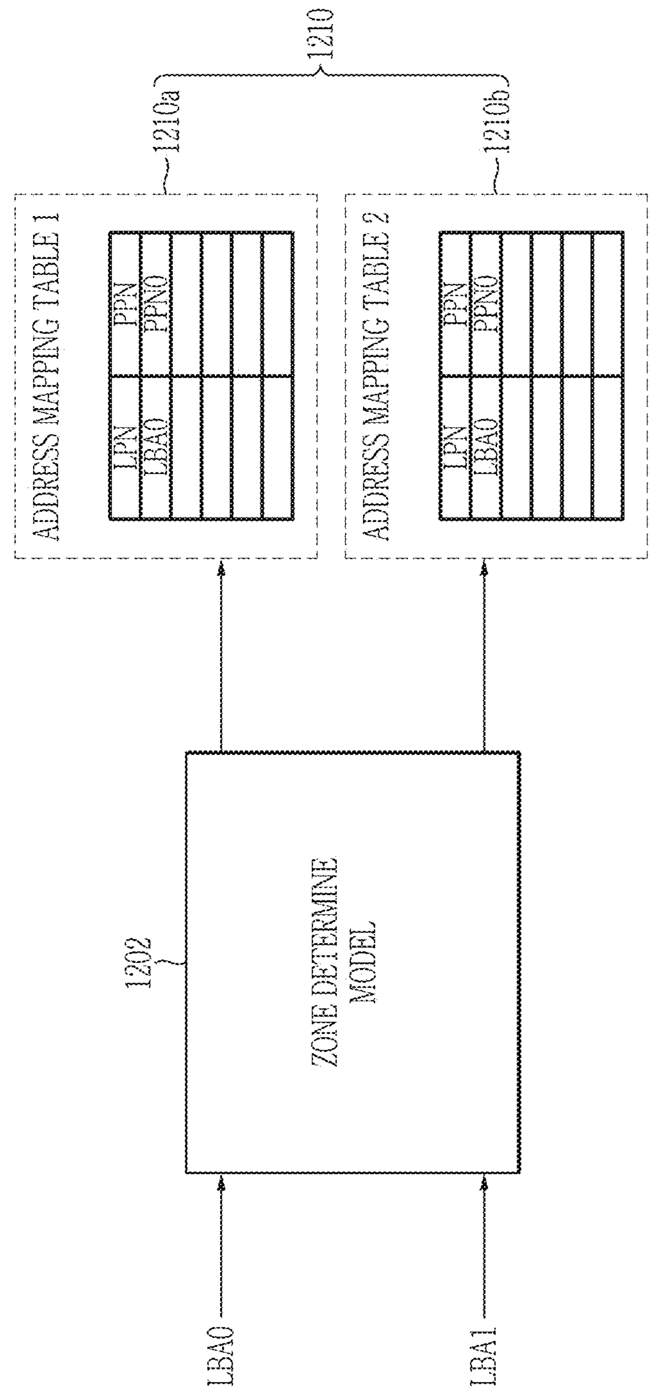

FIG. 9 is a flowchart of an operation of mapping a logical address of an operation method of a storage device to a physical address according to an example embodiment, and FIG. 10 to FIG. 12 are provided for explaining an operation of mapping a logical address to a physical address in a storage device according to an example embodiment.

Referring to FIG. 9, a storage controller 200 receives a logical block address LBA from a host (S900). The host may provide data DATA and the logical block address LBA of the data DATA to the storage controller 200.

The storage controller 200 determines a zone corresponding to the logical block address LBA (S910). The storage controller 200 maps logical block addresses to physical addresses within the determined zone (S920).

In an example embodiment, the storage controller 200 may determine one of a plurality of zones as a zone corresponding to the logical address based on a value of the logical address. Referring to FIG. 10, an FTL 1000 may include a bit selector 1002, a zone determiner 1004, and an address mapping table 1010.

The bit selector 1002 may select arbitrary bits BD0 and BD1 of input logical block addresses LBA0 and LBA1. The bit selector 1002 may select and output the MSB of logical block addresses LBA0 and LBA1, or select and output the LSB. In addition, the bit selector 1002 may select and output a plurality of bits of the logical block addresses LBA0 and LBA1.

The zone determiner 1004 may determine a zone corresponding to the logical block addresses LBA0 and LBA1 among a plurality of zones according to input bit values. For example, the zone determiner 1004 may determine a zone corresponding to the logical block address LBA0 as a first zone based on a value of bit BD0, and determine a zone corresponding to a logical block address LBA1 as a second zone based on a value of bit BD1.

The FTL 1000 may convert the logical block addresses LBA0 and LBA1 into a physical page number PPN0 corresponding to the logical block addresses LBA0 and LBA1 based on address mapping tables 1010*a* and 1010*b* corresponding to each zone.

In an example embodiment, the storage controller 200 may perform a hash operation on the logical address and determine one of a plurality of zones as a zone corresponding to the logical address based on a hash value of the hash operation. Referring to FIG. 11, the FTL 1100 may include a hash value calculator 1102, a zone determiner 1104, and an address mapping table 1110.

The hash value calculator 1102 may perform a hash operation on input logical block addresses LBA0 and LBA1, and output hash values HV0 and HV1 of the logical block addresses LBA0 and LBA1. In some example embodiments, the hash value calculator 1102 may apply different hash functions depending on values of logical block addresses LBA0 and LBA1. According to different hash functions, different hash values may be output even by the same logical block address.

The zone determiner 1104 may determine a zone corresponding to logical block addresses LBA0 and LBA1 among a plurality of zones according to input.

For example, the zone determiner 1104 determines a zone corresponding to the logical block address LBA0 as a first zone based on the hash value HV0, and determines a zone corresponding to the logical block address LBA1 as a second zone based on the hash value HV1.

The FTL 1100 may convert logical block addresses LBA0 and LBA1 into a physical page number PPN0 corresponding to the logical block addresses LBA0 and LBA1 based on address mapping tables 1110*a* and 1110*b* corresponding to each zone.

In an example embodiment, the storage controller 200 may determine one of a plurality of zones as a zone corresponding to a logical address based on a machine learning model. Referring to FIG. 12, an FTL 1200 may include a zone determination model 1202 and an address mapping table 1210.

The zone determination model 1202 may determine one of a plurality of zones as a zone corresponding to logical block addresses LBA0 and LBA1. The zone determination model 1202 may be a model that performs machine learning on a write request, and may be a machine learning model trained by providing various characteristics of a write request as input values of various machine learning algorithms.

The FTL 1200 may convert logical block addresses LBA0 and LBA1 into a physical page number PPN0 corresponding to the logical block addresses LBA0 and LBA1 based on address mapping tables 1210*a* and 1210*b* corresponding to each zone.

Next, referring to FIG. 13 to FIG. 19, a wear leveling operation of the storage device according to an example embodiment will be described.

Figure 13:
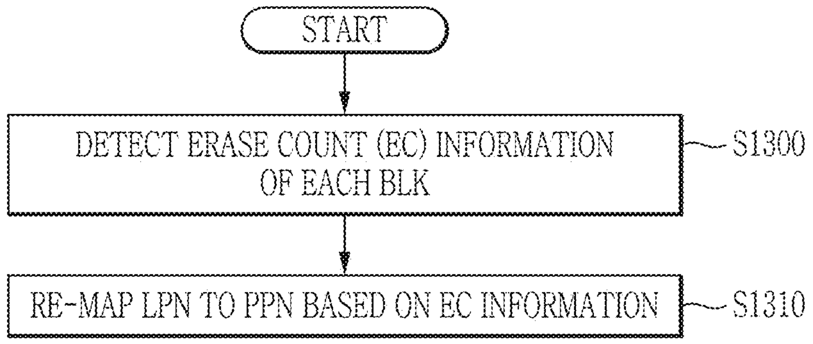
FIG. 13 is a flowchart of wear leveling of an operation method of a storage device according to an example embodiment.

FIG. 13 is a flowchart of wear leveling of an operation method of a storage device according to an example embodiment, and FIG. 14 to FIG. 19 are provided for explaining wear leveling in a storage device according to an example embodiment.

Referring to FIG. 13, the storage controller 200 detects EC information of blocks included in each zone (S1300). The storage controller 200 may scan EC information of all blocks or some blocks of the non-volatile memory. When the wear leveling condition is satisfied, the storage controller 200 may scan EC information of all blocks or some blocks sequentially or according to a prescribed method.

The storage controller 200 remaps the logical address and the physical address based on the EC information (S1310). The storage controller 200 may replace a block having the highest EC value and a block having the lowest EC value included in a zone different from the block having the highest EC value based on the EC information.

Figure 14:
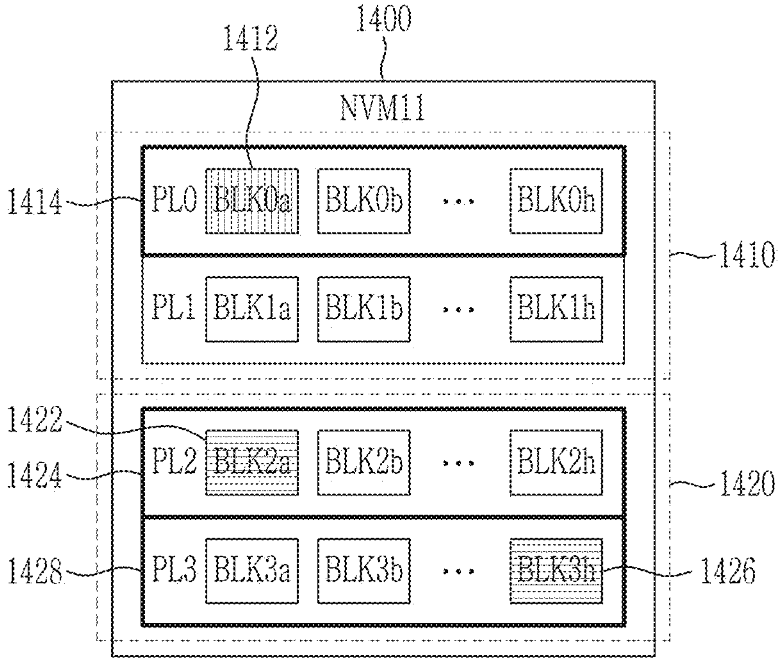
FIG. 14 to FIG. 19 illustrate wear leveling in a storage device according to an example embodiment.

The storage controller 200 may replace a block with the lowest EC value included in a different zone in the same non-volatile memory with a zone including a block with the highest EC value. Referring to FIG. 14, a non-volatile memory (NVM11) 1400 includes a plurality of planes PL0, PL1, PL2, and PL3, and each of the plurality of planes PL0, PL1, PL2, and PL3 may include a plurality of memory blocks BLK0*a*, BLK0*b*, . . . , BLK0*h*, BLK1*a*, BLK1*b*, . . . , BLK1*h*, BLK2*a*, BLK2*b*, . . . , BLK2*h*, BLK3*a*, BLK3*b*, . . . , and BLK3*h*. A first zone 1410 may include the planes PL0 and PL1, and a second zone 1420 may include the planes PL2 and PL3. In some example embodiments, the storage controller 200 may replace a block (BLK0*a*) 1412 with a high EC value included in the first zone 1410 with a block (BLK2*a*) 1422 or a block (BLK3*h*) 1426 with a low EC value in the second zone 1420. In some example embodiments, the storage controller 200 may replace a plane (PL0) 1414 including a block (BLK0*a*) 1412 having a high EC value included in the first zone 1410 with a plane (PL2) 1424 including a block (BLK2*a*) 1422 having a low EC value in the second zone 1420 or a plane (PL3) including a block (BLK3*h*) 1426 with a low EC value.

Figure 15:
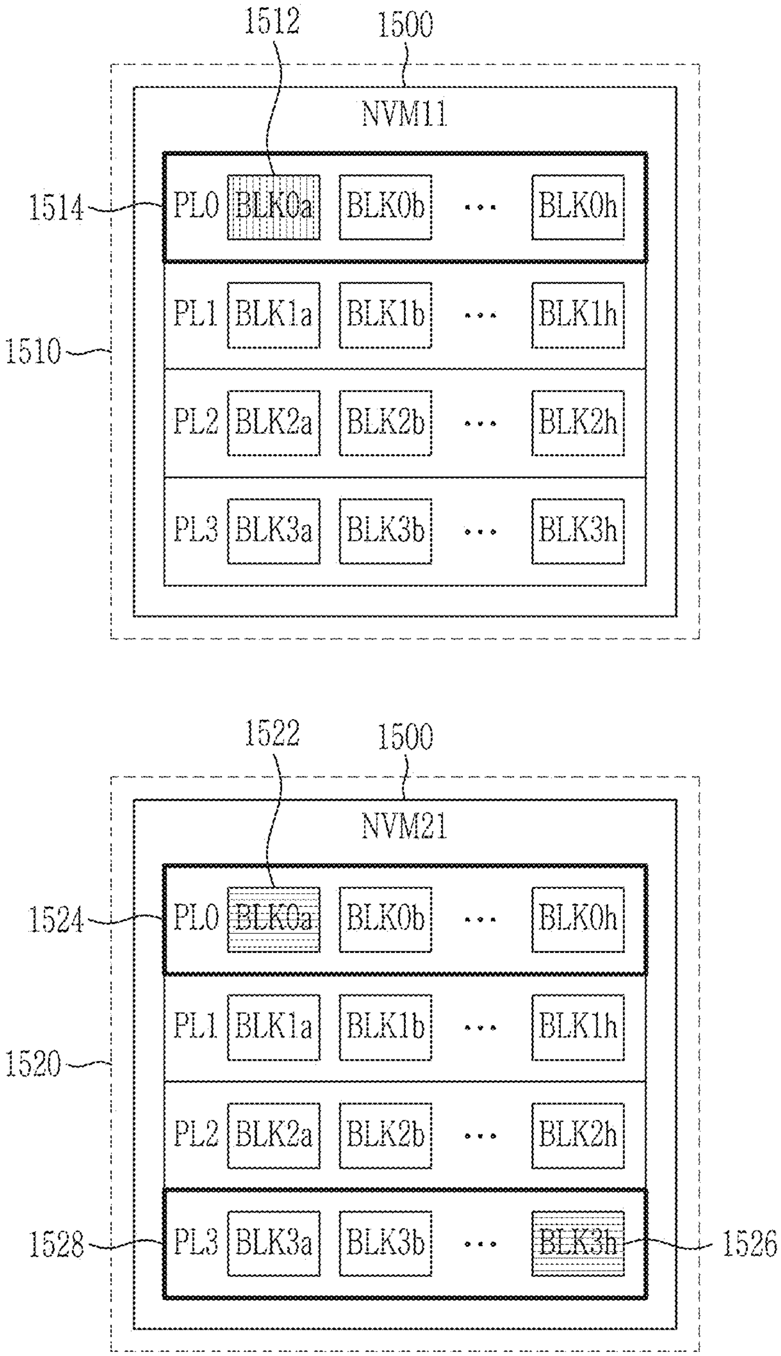

The storage controller 200 may replace blocks with the lowest EC value included in different zones in a different non-volatile memory connected to the same channel as the zone including the block with the highest EC value. Referring to FIG. 15, a first zone 1510 may include a non-volatile memory (NVM11) 1500, and a second zone 1520 may include a non-volatile memory (NVM21) 1500. In some example embodiments, the storage controller 200 may replace a block (BLK0*a*) 1512 with a high EC value included in the first zone 1510 with a block (BLK0*a*) 1522 with a low EC value or a block (BLK3*h*) 1526 with a low EC value in the second zone 1520. The storage controller 200 may replace the block (BLK0*a*) 1512 with a physical address of the block (BLK0*a*) 1512 in the first zone 1510 and the same physical address as the block (BLK0*a*) 1522 in the second zone 1520. In some example embodiments, the storage controller 200 may replace a plane (PL0) 1514 including the block (BLK0*a*) 1512 with a high EC value included in the first zone 1510 with a plane (PL0) 1524 including the block (BLK0*a*) 1522 with a low EC value in the second zone 1520 or a plane (PL3) 1528 including the block (BLK3*h*) 1526 a low EC value.

Figure 16:
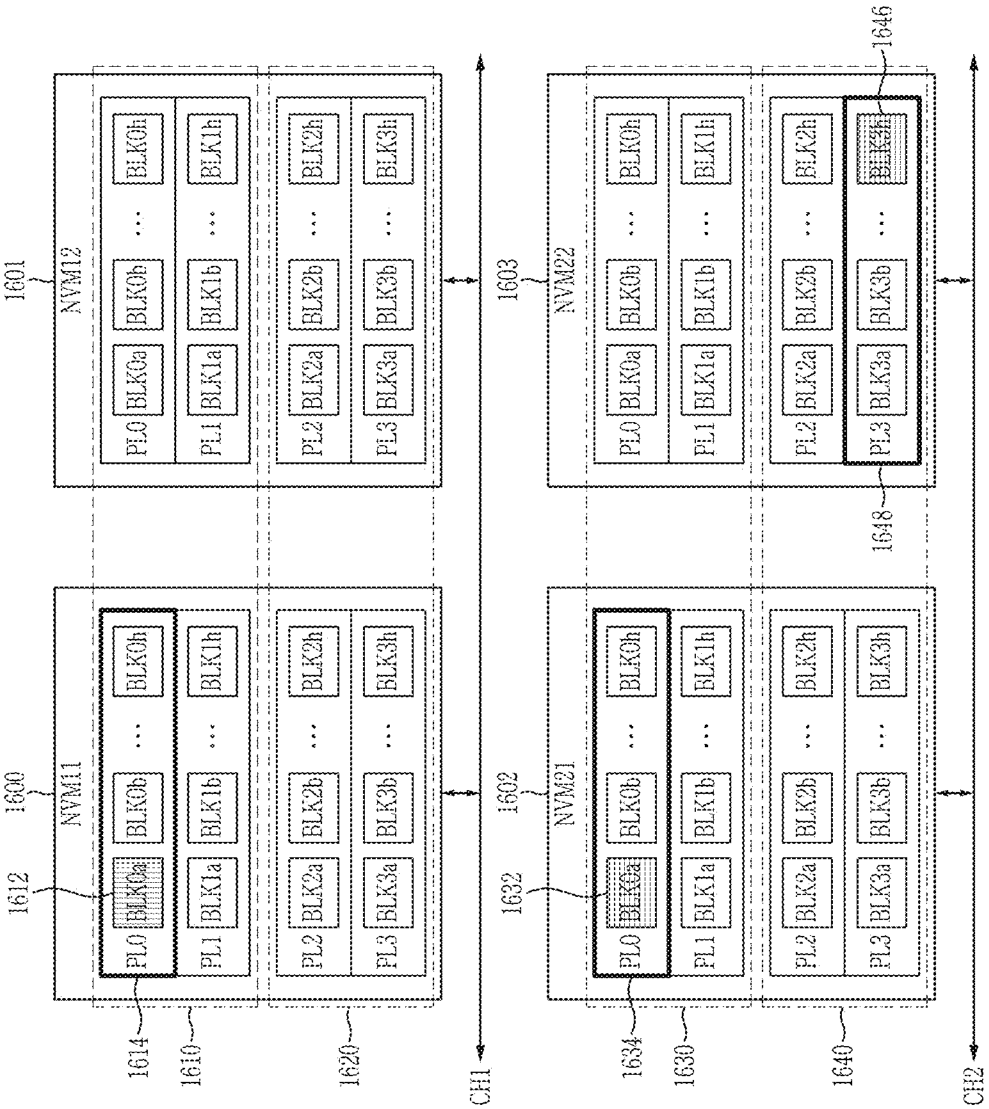

The storage controller 200 may replace blocks with the lowest EC value included in different zones in the non-volatile memory connected to a channel different from the zone including the block with the highest EC value. Referring to FIG. 16, a first zone 1610 may include planes PL0 and PL1 of a non-volatile memory (NVM11) 1600 and planes PL0 and PL1 of a non-volatile memory (NVM12), a second zone 1620 may include planes PL2 and PL3 of a non-volatile memory (NVM11) and planes PL2 and PL3 of a non-volatile memory (NVM12) 1601, a third zone 1630 may include planes PL0 and PL1 of a non-volatile memory (NVM21) 1602 and planes PL0 and PL1 of a non-volatile memory (NVM22) 1603, and a fourth zone 1640 may include planes PL2 and PL3 of a non-volatile memory (NVM21) 1602 and planes PL2 and PL3 of a non-volatile memory (NVM22) 1603. In some example embodiments, the storage controller 200 may replace a block (BLK0*a*) 1612 with a high EC value included in the first zone 1610 with a block with a low EC value in the third zone 1630 of a different non-volatile memory (NVM21) 1602 connected to a different channel CH2 or a block (BLK3*h*) 1646 with a low EC value in the fourth zone 1640 of a different non-volatile memories (NVM22) 1603 connected to a different channel CH2. The storage controller 200 may replace a block (BLK0*a*) 1612 with a physical address of a block (BLK0*a*) 1632 of the third zone 1630 having the same physical address as the physical address of the block (BLK0*a*) 1612. In some example embodiments, the storage controller 200 may replace a plane (PL0) 1614 including a block (BLK0*a*) 1612 having a high EC value included in the first zone 1610 with a plane (PL0) 1634 including a block BLK0*a* with a low EC value in the third zone 1630 or a plane (PL3) 1648 including a block BLK3*h* with a low EC value in the fourth zone 1640.

Figure 17:
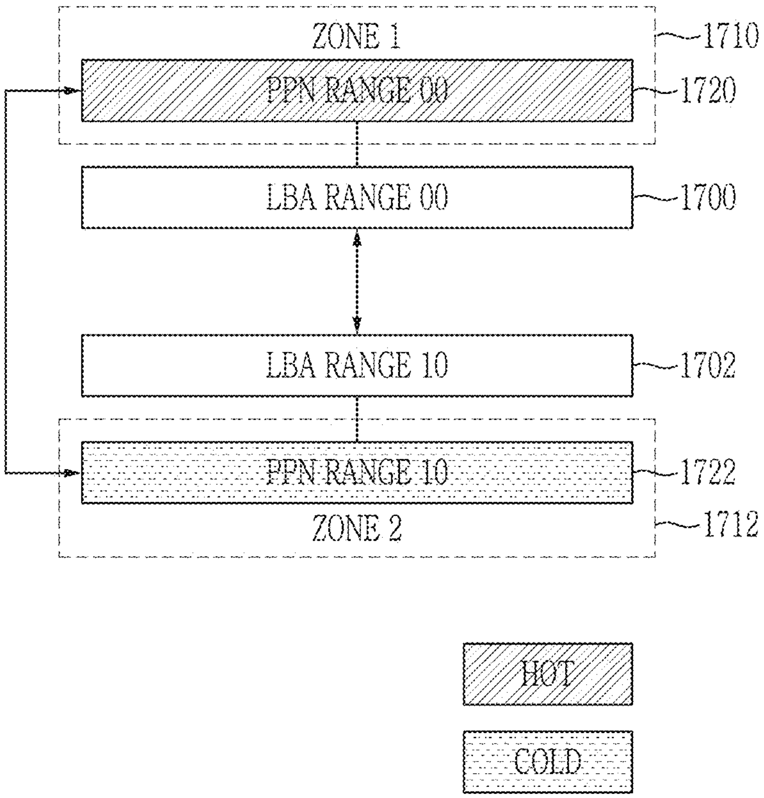

The storage controller 200 may determine a first logical address corresponding to a block having the highest EC value and determine a second logical address corresponding to a block having the lowest EC value included in a zone different from the block having the highest EC value based on the EC information, and may replace a physical address corresponding to the first logical address with a physical address corresponding to the second logical address. Referring to FIG. 17, a physical address range 1720 and a physical address range 1722 may be included in different zones 1710 and 1712. An LBA range 1700 may be mapped to a physical address range 1720 having a high EC value, and an LBA range 1702 may be mapped to a physical address range 1722 having a low EC value. The storage controller 200 may replace the LBA range 1700 having a high EC value with the LBA range 1702 having a low EC value. The LBA range 1700 may be mapped to a physical address range 1722 having a low EC value of the second zone 1712, and the LBA range 1702 may be mapped to a physical address range 1720 of the first zone 1710 having a high EC value.

Figure 18:
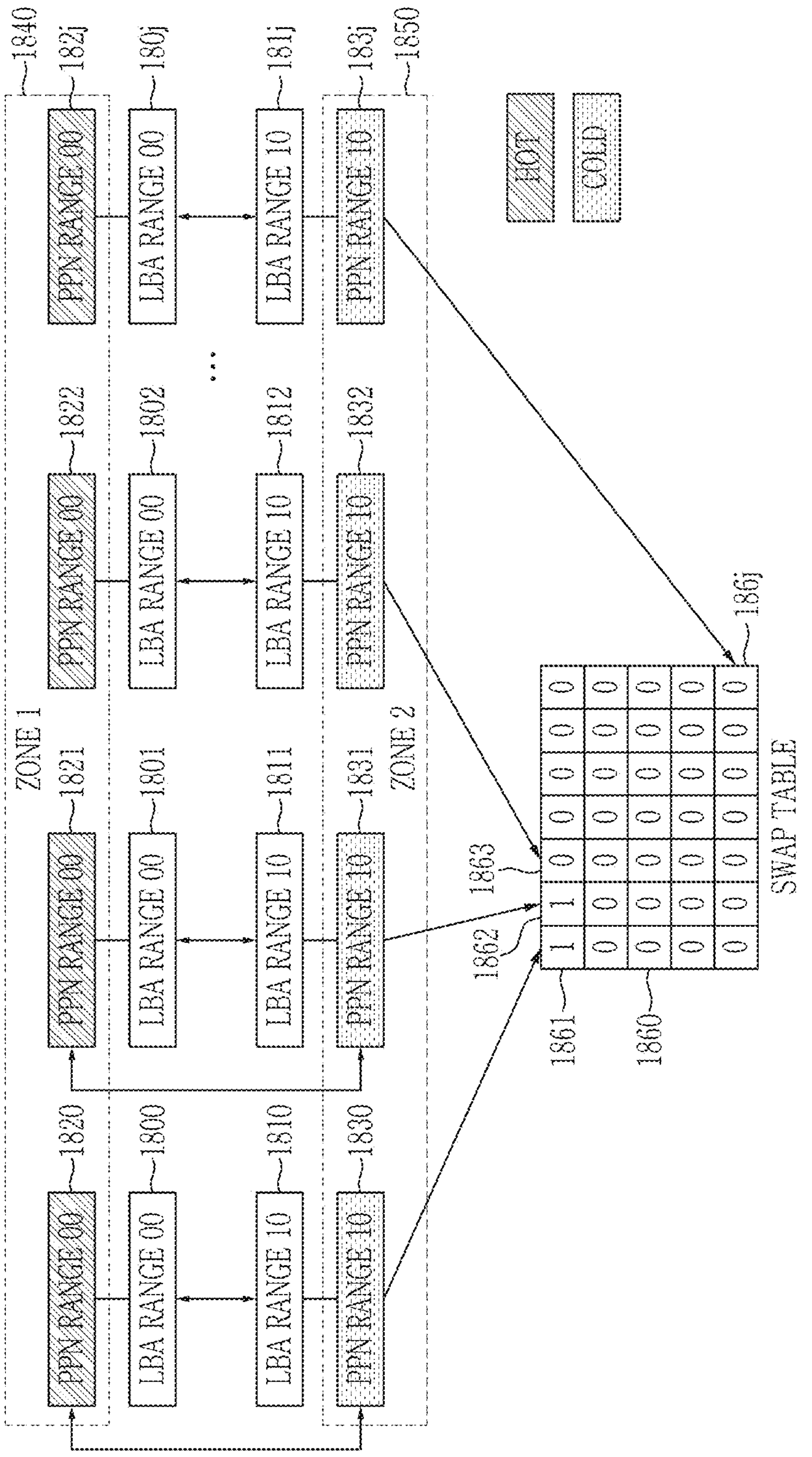

The storage controller 200 may perform a physical address range replacement operation for a plurality of logical address ranges using a replacement table. The storage controller 200 may sequentially perform a physical address range replacement operation for a plurality of logical address ranges while data input and output operations are not performed. Referring to FIG. 18, a plurality of physical address ranges 1820 to 182*j* and physical address ranges 1830 to 183*j* may be included in different zones 1840 and 1850. LBA ranges 1800 to 180*j* are mapped to the physical address ranges 1820 to 182*j* having a relatively high EC value (e.g., a high EC value above a specified threshold), and LBA ranges 1810 to 181*j* are mapped to physical address ranges 1830 to 183*j* having a relatively low EC value (e.g., a low EC value below a specified threshold). The storage controller 200 may replace the LBA ranges 1800 to 180*j* having a high EC value with the LBA ranges 1810 to 181*j* having a low EC value. In a replacement table 1860 to 186*j*, bits corresponding to LBA ranges 1802, 1812, 180*j*, and 181*j* for which replacement is not completed may have a logical value of "0". The storage controller 200 may change bits corresponding to the replacement LBA ranges 1800, 1810, 1801, and 1811 to a logic value of "1". The LBA ranges 1800 to 180*j* are mapped to physical address ranges 1830 to 183*j* having a low EC value, and the LBA ranges 1810 to 181*j* are mapped to the physical address ranges 1820 to 182*j* having a high EC value.

Figure 19:
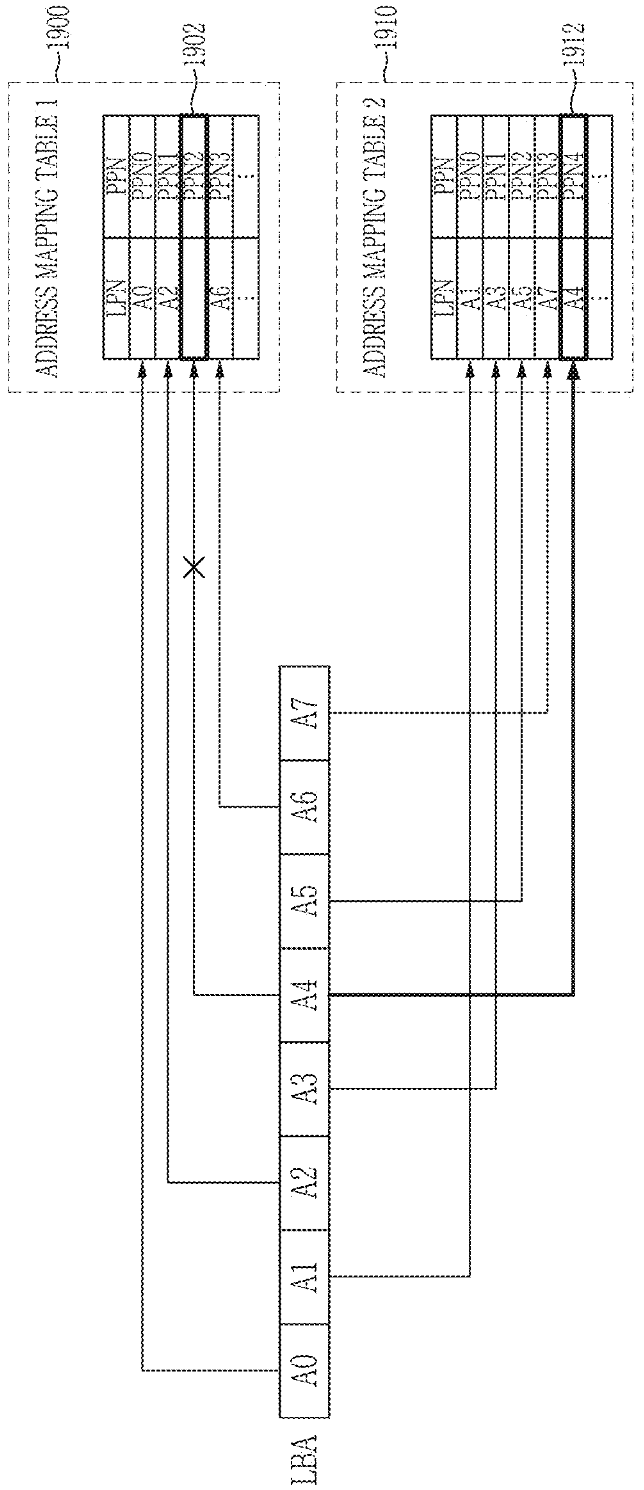

The storage controller 200 may change a logical address corresponding to a block having the highest EC value to another zone based on the EC information. The storage controller 200 may include a logical address corresponding to a block having the highest EC value in another zone having a low EC value of blocks such that EC values of blocks included in a plurality of zones become uniform. Referring to FIG. 19, in address mapping tables 1900 and 1910, each of a plurality of logical addresses A0 to A7 may be mapped to a physical address of a corresponding zone. When an EC value of a block corresponding to the physical address PPN2 of the first zone is the highest, the storage controller 200 may map the logical address A4 mapped to the physical address PPN2 (1902) of the first zone to a physical address PPN4 (1912) of a block of another zone.

Figure 20:
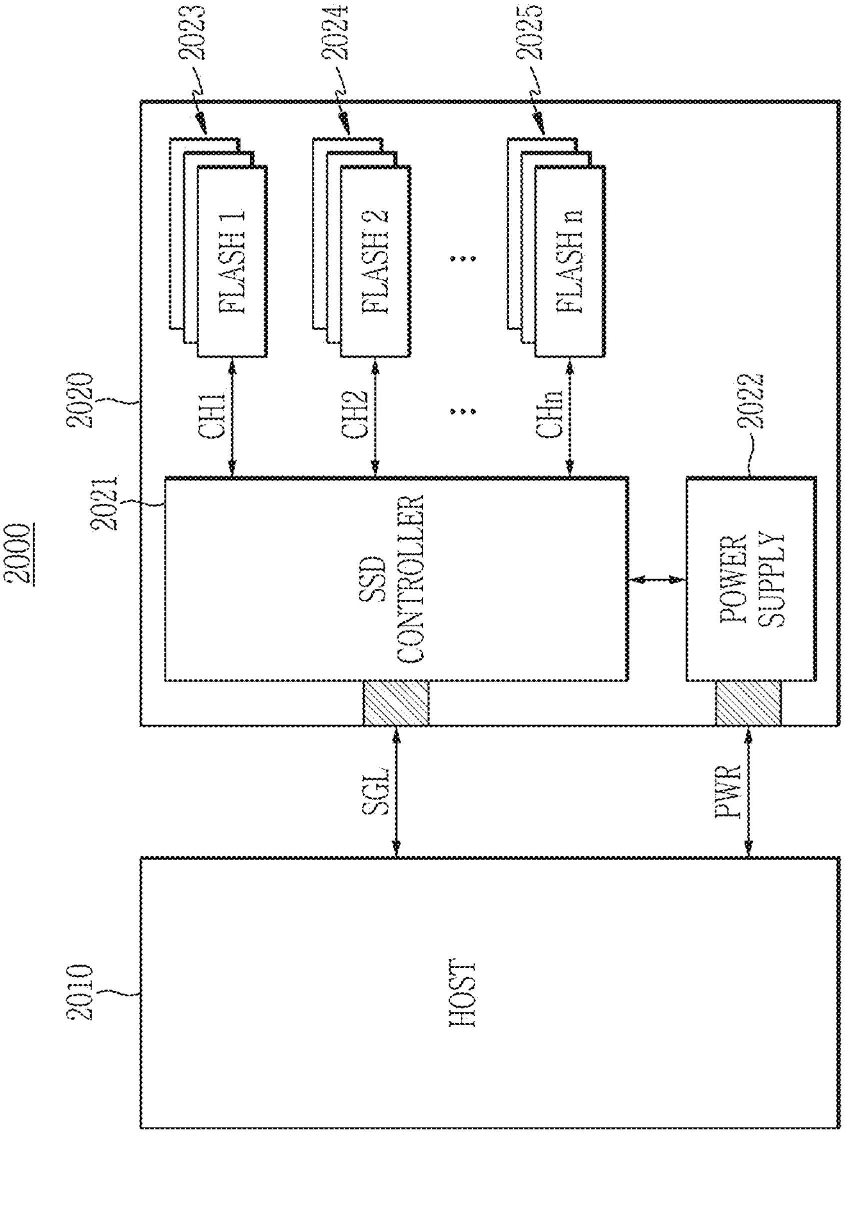
FIG. 20 is a block diagram of an example of applying a storage device according to an example embodiment to a solid-state drive (SSD) system.

Referring to FIG. 20, an SSD system 2000 may include a host 2010 and an SSD 2020.

The SSD 2020 may be implemented using the example embodiments described with reference to FIG. 1 to FIG. 19. The SSD 2020 may transmit and receive signals with the host 2010 through a signal connector SGL and receive power input through a power connector PWR.

The SSD 2020 may include a controller 2021, an auxiliary power supply 2022, and a plurality of memory systems 2023, 2024, and 2025. Each of the plurality of memory systems 2023, 2024, and 2025 may include at least one flash memory device as a storage device. In addition, each flash memory device may include at least one die DIE, and at least one block may be disposed in each die DIE.

The controller 2021 may communicate with the plurality of memory systems 2023, 2024, and 2025 through a plurality of channels Ch1 to Chn. The controller 2021 divides the plurality of memory systems 2023, 2024, and 2025 into a plurality of zones, determines a zone corresponding to a logical address based on the logical address input from the host 2010, and matches the physical address and logical address of the determined zone. The controller 2021 may remap logical addresses and physical addresses between different zones based on EC values of blocks of the plurality of memory systems 2023, 2024, and 2025.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While the inventive concepts has been described in connection with some example embodiments, it is to be understood that the inventive concepts is not limited to the disclosed example embodiments. On the contrary, it is intended to cover various modifications and equivalent arrangements included within the scope of the inventive concepts.

What is claimed is:

1. A storage device comprising:

a non-volatile memory including a plurality of blocks; and a storage controller configured to divide the plurality of blocks into a plurality of zones, determine a first zone of the plurality of zones corresponding to a logical address received from a host, based on a bit value of the logical address, map the logical address to a physical address corresponding to a first block in the first zone, and replace at least one of the logical address or the first block with a logical address or a block of a second zone of the plurality of zones, the second zone different from the first zone.

2. The storage device of claim 1, wherein the storage controller is configured to replace the first block with a second block having a lowest erase count value of the second zone.

3. The storage device of claim 2, wherein the physical address of the first block and the physical address of the second block are same.

4. The storage device of claim 1, wherein the storage controller is configured to replace one of a super block, a plane, a bank, and a channel including the first block, with a corresponding one of a super block, a plane, a bank, and a channel including a second block, the second block having a lowest erase count value of the second zone.

5. The storage device of claim 1, wherein the storage controller is configured to determine a first logical address corresponding to the first block, determine a second logical address corresponding to a second block having a lowest erase count value, and replace the first logical address with the second logical address.

6. The storage device of claim 1, wherein the storage controller is configured to determine a plurality of first logical address ranges corresponding to blocks having a high erase count value above a specified high value threshold in the first zone, determine a plurality of second logical address ranges corresponding to blocks having a low erase count value below a specified low value threshold in the second zone, and replace the plurality of first logical address ranges and the plurality of second logical address ranges with each other using a replacement table indicating whether each of the plurality of first logical address ranges is replaced.

7. The storage device of claim 1, wherein the storage controller is configured to map the logical address to a physical address of an address mapping table corresponding to the second zone such that erase count values of blocks included in the first zone and the second zone are uniform.

8. The storage device of claim 1, wherein the storage controller is configured to determine the first zone based on an arbitrary bit value of the logical address.

9. The storage device of claim 1, wherein the storage controller is configured to perform a hash operation on the logical address and determine the first zone based on a hash value of the logical address.

10. The storage device of claim 1, wherein the storage controller is configured to determine the first zone by inputting the logical address to a trained machine learning model with a characteristic of a write request input from the host.

11. An operation method of a storage device, comprising:

dividing a plurality of blocks included in a non-volatile memory into a plurality of zones;

receiving a logical address from a host;

determining a first zone of the plurality of zones corresponding to the logical address, based on a bit value of the logical address;

mapping the logical address to a physical address corresponding to a first block of the first zone; and replacing at least one of the logical address or the first block with a logical address or block of a second zone of the plurality of zones, based on an erase count value of the first block, the second zone different from the first zone.

12. The operation method of the storage device of claim 11, wherein the replacing comprises replacing the first block with a second block having a lowest erase count value of the second zone.

13. The operation method of the storage device of claim 12, wherein a physical address of the first block and a physical address of the second block are same.

14. The operation method of the storage device of claim 11, wherein the replacing comprises replacing one of a super block, a plane, a bank, and a channel including the first block, with one of a super block, a plane, a bank, and a channel including a second block that has a lowest erase count value of the second zone.

15. The operation method of the storage device of claim 11, wherein the replacing comprises determining a first logical address corresponding to the first block, determining a second logical address corresponding to a second block having a lowest erase count value, and replacing the first logical address with the second logical address.

16. The operation method of the storage device of claim 11, wherein the replacing comprises determining a plurality of first logical address ranges corresponding to blocks having high erase count values above a specified high value threshold in the first zone, determining a plurality of second logical address ranges corresponding to blocks having low erase count values below a specified low value threshold in the second zone, and replacing the plurality of first logical address ranges and the plurality of second logical address ranges with each other using a replacement table indicating whether each of the plurality of first logical address ranges is replaced.

17. The operation method of the storage device of claim 11, wherein the replacing comprises mapping the logical address to a physical address of an address mapping table corresponding to the second zone such that erase count values of blocks included in the first zone and the second zone are uniform.

18. The operation method of the storage device of claim 11, wherein the determining the first zone of the plurality of zones corresponding to the logical address comprises:

determining the first zone based on a random bit value of the logical address;

performing a hash operation on the logical address and determining the first zone based on a hash value of the logical address; and determining the first zone by inputting the logical address to a trained machine learning model with a characteristic of a write request input from the host.

19. A storage device comprising:

processing circuitry configured to, store a plurality of address mapping tables that correspond to a plurality of zones divided from a plurality of blocks of a non-volatile memory and store mapping information of a logical address and a physical address, perform wear leveling by replacing a block having a highest erase count value in a first zone of the plurality of zones with a block having a lowest erase count value in a second zone of the plurality of zones, determine the first zone or the second zone corresponding to each logical address based on a bit value of the logical address, and update a first address mapping table of the plurality of address mapping tables corresponding to the first zone, and a second address mapping table of the plurality of address mapping tables corresponding to the second zone, by reflecting a result of the wear leveling.

20. The storage device of claim 19, wherein the processing circuitry is configured to convert the logical address to a physical address using an address mapping table that corresponds to the first zone or the second zone of the plurality of address mapping tables.

* * * * *